US010812732B2

(12) United States Patent
Irie et al.

(10) Patent No.: US 10,812,732 B2
(45) Date of Patent: Oct. 20, 2020

(54) DIGITAL CAMERA WITH FOCAL-PLANE SHUTTER AND CONTROL METHOD OF DIGITAL CAMERA

(71) Applicant: FUJIFILM Corporation, Tokyo (JP)

(72) Inventors: Fuminori Irie, Saitama (JP); Hirofumi Horii, Saitama (JP); Kentaro Tokiwa, Saitama (JP); Atsushi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/283,352

(22) Filed: Feb. 22, 2019

(65) Prior Publication Data

US 2019/0191070 A1 Jun. 20, 2019

Related U.S. Application Data

(63) Continuation of application No. PCT/JP2017/026473, filed on Jul. 21, 2017.

(30) Foreign Application Priority Data

Aug. 25, 2016 (JP) ................................ 2016-165059

(51) Int. Cl.
*H04N 5/235* (2006.01)
*G03B 9/36* (2006.01)
(Continued)

(52) U.S. Cl.
CPC ............ *H04N 5/2353* (2013.01); *G03B 9/36* (2013.01); *H04N 5/225* (2013.01); *H04N 5/2254* (2013.01); *H04N 5/232411* (2018.08)

(58) Field of Classification Search
None
See application file for complete search history.

(56) References Cited

U.S. PATENT DOCUMENTS 7,239,349 B2 * 7/2007 Saito .................. H04N 1/00236 348/207.1
2006/0029384 A1 * 2/2006 Tomatsu ................ G03B 7/093 396/447
(Continued)

FOREIGN PATENT DOCUMENTS

JP 2003-222928 A 8/2003
JP 2006-98909 A 4/2006
(Continued)

OTHER PUBLICATIONS

International Preliminary Report on Patentability and Written Opinion of the International Searching Authority (Forms PCT/IB/326, PCT/IB/373. and PCT/ISA/237) for International Application No. PCT/JP2017/26473, dated Mar. 7, 2019, with English translation
(Continued)

*Primary Examiner* — Cynthia Segura
(74) *Attorney, Agent, or Firm* — Birch, Stewart, Kolasch & Birch, LLP

(57) ABSTRACT

Provided are a digital camera and a control method of a digital camera which are capable of reducing power consumption in a focal-plane shutter capable of performing a normal opening operation. In the focal-plane shutter capable of performing the normal opening operation, in a case where a shutter release switch is operated, exposure using an electronic shutter is started. Thereafter, curtain running preparation for magnetizing a front-curtain electromagnet and a rear-curtain electromagnet and unlocking a second front-curtain drive member and a rear-curtain drive member locked in charge positions by a lock mechanism, which is a curtain running preparation operation of the focal-plane shutter, is performed immediately before exposure of a still image is completed. The exposure is ended by demagnetizing the rear-curtain electromagnet after the curtain running preparation is ended and causing rear curtains to run in a
(Continued)

closing direction through the rear-curtain drive member by a biasing force of a rear-curtain running spring. Accordingly, an electrical conduction time of the rear-curtain electromagnet is shortened, and thus, power consumption is reduced.

14 Claims, 22 Drawing Sheets

(51) Int. Cl.
*H04N 5/225* (2006.01)
*H04N 5/232* (2006.01)

(56) References Cited

U.S. PATENT DOCUMENTS

| | | | | |
|---|---|---|---|---|
| 2006/0067676 | A1 | 3/2006 | Toyoda | |
| 2009/0231450 | A1 | 9/2009 | Tanaka et al. | |
| 2010/0026881 | A1* | 2/2010 | Kim | G03B 9/34 348/362 |
| 2010/0027987 | A1 | 2/2010 | Tanaka et al. | |
| 2011/0129212 | A1 | 6/2011 | Yamaguchi et al. | |
| 2011/0164871 | A1* | 7/2011 | Shintani | G03B 9/40 396/484 |
| 2011/0176799 | A1* | 7/2011 | Shintani | G03B 9/14 396/484 |
| 2012/0147201 | A1* | 6/2012 | Asukabe | H04N 5/23274 348/208.1 |
| 2014/0160312 | A1* | 6/2014 | Shintani | G03B 9/36 348/220.1 |
| 2020/0012172 | A1* | 1/2020 | Irie | H04N 5/2353 |

FOREIGN PATENT DOCUMENTS

| | | | |
|---|---|---|---|
| JP | 2007-193155 | A | 8/2007 |
| JP | 2007-316503 | A | 12/2007 |
| JP | 2010-245604 | A | 10/2010 |
| JP | 2011-13539 | A | 1/2011 |
| JP | 2011-113060 | A | 6/2011 |
| JP | 2012-14146 | A | 1/2012 |
| JP | 2013-207631 | A | 10/2013 |

OTHER PUBLICATIONS

International Search Report {Forms PCT/ISA/210) for International Application No. PCT/JP2017/026473, dated Oct. 17, 2017, with English translation.

German Office Action, dated Dec. 13, 2019, for counterpart German Application No. 112017003715.8, with an English translation.

Japanese Office Action for Japanese Patent Application No. 2018-535534, dated May 16, 2019, with English translation.

* cited by examiner

DIGITAL CAMERA WITH FOCAL-PLANE SHUTTER AND CONTROL METHOD OF DIGITAL CAMERA

CROSS-REFERENCE TO RELATED APPLICATIONS

The present application is a Continuation of PCT International Application No. PCT/JP2017/026473 filed on Jul. 21, 2017 claiming priority under 35 U.S.C § 119(a) to Japanese Patent Application No. 2016-165059 filed on Aug. 25, 2016. Each of the above applications is hereby expressly incorporated by reference, in their entirety, into the present application.

BACKGROUND OF THE INVENTION

1. Field of the Invention

The present invention relates to a digital camera and a control method of a digital camera, and particularly, to a digital camera and a control method of a digital camera having a focal-plane shutter mounted thereon.

2. Description of the Related Art

A focal-plane shutter capable of switching between a normal closing operation (first imaging mode) and a normal opening operation (second imaging mode) has been known as this type of focal-plane shutter (JP2011-113060A).

The focal-plane shutter capable of switching between the normal opening operation and the normal closing operation is separately provided with a first drive member for charging and a second drive member connected to front curtains, as drive members that drive the front curtains and is provided with a restraint member that inhibits the movement of the second drive member (a closing operation of the front curtains) at the time of a charge operation of the first drive member. At the time of the normal opening operation, the focal-plane shutter is held in the opened state even after the charging is completed by inhibiting the closing operation of the front curtains by the restraint member, and thus, it is possible to image and display a live view image.

JP2011-113060A describes a mode (a third imaging mode) in which both front curtains and rear curtains are held in a fully opened state through the normal opening operation at the time of a charge state, exposure is started by controlling an imaging element by an electronic control circuit without operating the front curtains at the time of imaging a still image, and the exposure is ended by closing the rear curtains.

JP2011-013539A describes a technology in which exposure is started by an electronic shutter at the time of imaging a still image and the exposure is ended by an operation for closing the front curtains held in the opened state in a digital camera having a focal-plane shutter capable of performing the normal opening operation (a focal-plane shutter capable of holding the front curtains in the opened state) mounted thereon (FIG. 6F of JP2011-013539A).

SUMMARY OF THE INVENTION

In both JP2011-113060A and JP2011-013539A, in the focal-plane shutter capable of performing the normal opening operation, the exposure is started by the electronic shutter at the time of imaging the still image, and the exposure is ended by closing the rear curtains held in the opened state (JP2011-113060A) or the exposure is ended by closing the front curtains held in the opened state (JP2011-013539A).

However, in the case of long exposure in which an exposure time of the still image is long, since the digital camera described in JP2011-113060A needs to continue to magnetize a rear-curtain electromagnetic actuator for holding the rear curtains in the fully opened state for at least a period of the exposure time, there is a problem that power consumption increases, and there is also a problem that noise caused by heat generation of the rear-curtain electromagnetic actuator increases.

In the case of the long exposure in which the exposure time of the still image is long, since the digital camera described in JP2011-013539A holds a front-curtain running member and a rear-curtain running member in upper positions by using attractive forces of a first electromagnet coil and a second electromagnet coil for at least the period of the exposure time, there is the same problem as that of the invention described in JP2011-113060A.

The present invention has been made in view of such circumstances, and an object of the present invention is to provide a digital camera and a control method of a digital camera which are capable of reducing power consumption in a focal-plane shutter capable of performing a normal opening operation.

In order to achieve the aforementioned object, in accordance with the invention according to an aspect, there is provided a digital camera comprising a focal-plane shutter; an imaging element; and a controller that controls the focal-plane shutter and the imaging element. The focal-plane shutter includes a first front-curtain drive member that fully opens an exposure opening portion by causing front curtains to run in an opening direction through movement in a first direction and fully closes the exposure opening portion by causing the front curtains to run in a closing direction through movement in a second direction opposite to the first direction, a second front-curtain drive member that is biased in the first direction by a front-curtain running spring and abuts on the first front-curtain drive member to move the first front-curtain drive member in the first direction, a return spring that biases the front curtains in the closing direction by using a biasing force weaker than a biasing force of the front-curtain running spring, a rear-curtain drive member that is biased in the first direction by a rear-curtain running spring, the rear-curtain drive member fully closing the exposure opening portion by causing rear curtains to run in a closing direction through movement in the first direction and fully opening the exposure opening portion by causing the rear curtains to run in an opening direction through movement in the second direction, a charging member that moves the second front-curtain drive member and the rear-curtain drive member in the second direction against biasing forces of the front-curtain running spring and the rear-curtain running spring, respectively, and moves the second front-curtain drive member and the rear-curtain drive member to charge positions close to movement ends in the second direction, respectively, a lock mechanism that holds the second front-curtain drive member and the rear-curtain drive member in the charge positions, respectively, in a case where the second front-curtain drive member and the rear-curtain drive member are respectively positioned in the charge positions, a front-curtain lock member that inhibits the running of the front curtains in the closing direction in a case where the front curtains are fully opened, and a front-curtain electromagnetic actuator and a rear-curtain electromagnetic actuator that respectively inhibit the movement of the second front-curtain drive member and the rear-curtain drive member in the first direction using the front-curtain running spring and the rear-curtain running spring in a direct or indirect manner by being electrically conducted in a case where the second front-curtain drive member and the rear-curtain drive member are respectively positioned in the charge positions. The controller is configured to fully open the exposure opening portion by moving the second front-curtain drive member and the rear-curtain drive member to the charge positions, respectively, by using the charging member and holding the second front-curtain drive member and the rear-curtain drive member in the charge positions, respectively, by the lock mechanism, in a state in which the running of the front curtains in the closing direction is inhibited by the front-curtain lock member, perform electronic shutter control for starting exposure by discharging electric charges accumulated in the imaging element in a case where the exposure opening portion is fully opened and a shutter release switch is operated, perform curtain running preparation for inhibiting rotational movement of the rear-curtain drive member in the first direction by magnetizing at least the rear-curtain electromagnetic actuator immediately before the exposure is completed and canceling the holding of the second front-curtain drive member and the rear-curtain drive member in the charge positions using the lock mechanism, and complete the exposure by demagnetizing the rear-curtain electromagnetic actuator after the curtain running preparation is ended and causing the rear curtains to run in the closing direction through the rear-curtain drive member by using the biasing force of the rear-curtain running spring.

According to the aspect of the present invention, in the focal-plane shutter capable of holding the exposure opening portion in the opened state (the focal-plane shutter capable of performing a so-called normal opening operation) in the charge state of the focal-plane shutter, in a case where the exposure opening portion is fully opened and the shutter release switch is operated, the exposure at the time of imaging the still image is started through the electronic shutter control, the curtain running preparation is performed by inhibiting the running of the rear curtains in the closing direction by magnetizing the rear-curtain electromagnetic actuator immediately before the exposure is completed, and the exposure is completed by demagnetizing the rear-curtain electromagnetic actuator after the curtain running preparation is ended and causing the rear curtains to run in the closing direction. Accordingly, an electrical conduction time of the rear-curtain electromagnetic actuator is extremely shortened, and thus, power consumption (magnetization power) is reduced. Heat generation caused by the reduction in the magnetization power is reduced, and thus, an increase in noise (deterioration in image quality) caused by the heat generation is prevented.

In the digital camera according to another aspect of the present invention, it is preferable that the controller continuously reads out image signals from the imaging element, and enables a live view image to be displayed in a case where the exposure opening portion is fully opened. Since the focal-plane shutter is capable of performing the normal opening operation, it is possible to hold the exposure opening portion in the opened state in the charge state of the focal-plane shutter, and thus, it is possible to image and display the live view image.

In the digital camera according to still another aspect of the present invention, it is preferable that the controller is configured to read out image signals from the imaging element for a period during which the exposure opening portion is fully closed after the exposure is completed in a case of long exposure in which an exposure time is equal to or greater than a predetermined time, read out noise signals from the imaging element by performing the electronic shutter control for accumulating the electric charges for the same time as a time during which the imaging element is exposed for a period during which the exposure opening portion is fully closed after the image signals are read out, and obtain image signals from which noise is removed by subtracting the readout noise signals from the readout image signals. Dark current noise included in the captured image increases in proportion to an exposure time in the imaging element. Thus, in the case of the long exposure, the image signals are read out from the imaging element for a period during which the exposure opening portion is fully closed after the exposure is completed, the electronic shutter control for accumulating the electric charges by as the same time as the exposure time is subsequently performed, and the signals (noise signals) corresponding to the accumulated electric charges. The noise removal for long exposure is performed by subtracting the noise signals read out later from the image signals including the previously readout noise signals, and thus, the image quality of the image in the long exposure is improved. Since it is possible to shorten the electrical conduction time of the rear-curtain electromagnetic actuator irrespective of the length of the exposure time, the present invention can reduce the magnetization power especially in the case of the long exposure.

In the digital camera according to still another aspect of the present invention, it is preferable that the controller discharges the electric charges accumulated in the imaging element according to a reset sequence that simulates running characteristics of the rear curtains in the closing direction in a case where the electronic shutter control is performed. Accordingly, it is possible to set the exposure time to be constant irrespective of the position of the captured image in a running direction of the rear curtains, and it is possible to improve the image quality.

In the digital camera according to still another aspect of the present invention, it is preferable that in a case where an exposure start command through an operation of the shutter release switch is input, the controller starts the exposure through the electronic shutter control by delaying a time by at least the time required for the curtain running preparation after the exposure start command is input and in a case where an exposure completion command through an operation of the shutter release switch is input, the controller performs the curtain running preparation, and completes the exposure by demagnetizing the rear-curtain electromagnetic actuator after the delayed time elapses from when the exposure completion command is input and causing the rear curtains to run in the closing direction through the rear-curtain drive member by using the biasing force of the rear-curtain running spring. Accordingly, it is possible to perform the exposure by the same time as the time during which the shutter release switch is operated without being influenced by a time of a curtain running preparation operation at the time of performing the bulb imaging in which the exposure is continued by the time during which the shutter release switch is operated (pushed).

The digital camera according to still another aspect of the present invention further comprises a determination unit that determines whether or not an exposure time is equal to or greater than a time required for the curtain running preparation. It is preferable that in a case where the determination unit determines that the exposure time is less than the time required for the curtain running preparation, the controller completes the curtain running preparation at least before the rear-curtain electromagnetic actuator is demagnetized by setting starting of an operation of the curtain running preparation to be performed earlier than starting of the electronic shutter control. Accordingly, it is possible to perform imaging in short exposure even in a case where the starting of the exposure is performed through the electronic shutter control and the completion of the exposure is performed through the running of the rear curtains.

The digital camera according to still another aspect of the present invention further comprises a switch unit that switches between a first mode and a second mode. It is preferable that in a case where the switching to the first mode is performed by the switch unit, the controller fully opens the exposure opening portion by moving the second front-curtain drive member and the rear-curtain drive member to the charge positions, respectively, by the charging member and holding the second front-curtain drive member and the rear-curtain drive member in the charge positions by the lock mechanism in a state in which the running of the front curtains in the closing direction is inhibited by the front-curtain lock member, performs the electronic shutter control for starting the exposure by discharging the electric charges accumulated in the imaging element in a case where the exposure opening portion is fully opened and the shutter release switch is operated, performs the curtain running preparation for inhibiting the rotational movement of the rear-curtain drive member in the first direction by magnetizing at least the rear-curtain electromagnetic actuator immediately before the exposure is completed and canceling the holding of the second front-curtain drive member and the rear-curtain drive member in the charge positions using the lock mechanism, and completes the exposure by demagnetizing the rear-curtain electromagnetic actuator after the curtain running preparation is ended and causing the rear curtains to run in the closing direction through the rear-curtain drive member by using the biasing force of the rear-curtain running spring, and in a case where the switching to the second mode is performed by the switch unit, the controller fully opens the exposure opening portion by moving the second front-curtain drive member and the rear-curtain drive member to the charge positions, respectively, by the charging member and holding the second front-curtain drive member and the rear-curtain drive member in the charge positions, respectively, by the lock mechanism, in a state in which the running of the front curtains in the closing direction is inhibited by the front-curtain lock member, fully closes the exposure opening portion by canceling the inhibition of the running of the front curtains in the closing direction using the front-curtain lock member and causing the front curtains to run in the closing direction by using the biasing force of the return spring in a case where the exposure opening portion is fully opened and the shutter release switch is operated, performs the curtain running preparation for inhibiting the movement of the second front-curtain drive member and the rear-curtain drive member in the first direction by magnetizing the front-curtain electromagnetic actuator and the rear-curtain electromagnetic actuator, respectively, and canceling the holding of the second front-curtain drive member and the rear-curtain drive member in the charge positions using the lock mechanism, start the exposure by demagnetizing the front-curtain electromagnetic actuator after the curtain running preparation is ended and causing the front curtains to run in the opening direction through the second front-curtain drive member and the first front-curtain drive member by using the biasing force of the front-curtain running spring, and completes the exposure by demagnetizing the rear-curtain electromagnetic actuator and causing the rear curtains to run in the closing direction through the rear-curtain drive member by using the biasing force of the rear-curtain running spring after the exposure is started.

The first mode is a mode in which in a case where the focal-plane shutter performs the normal opening operation and the shutter release switch is operated, the exposure at the time of imaging the still image is started through the electronic shutter control, the curtain running preparation is performed by inhibiting the running of the rear curtains in the closing direction by magnetizing the rear-curtain electromagnetic actuator immediately before the exposure is completed, and the exposure is completed by demagnetizing the rear-curtain electromagnetic actuator after the curtain running preparation is ended and causing the rear curtains to run in the closing direction.

The second mode is a mode in which in a case where the focal-plane shutter performs the normal opening operation and the shutter release switch is operated, the inhibition of the running of the front curtains in the closing direction using the front-curtain lock member is canceled, the exposure opening portion is fully closed by causing the front curtains to run in the closing direction by using the biasing force of the return spring, the curtain running preparation is performed by magnetizing the front-curtain electromagnetic actuator and the rear-curtain electromagnetic actuator, the exposure is started by demagnetizing the front-curtain electromagnetic actuator and causing the front curtains to run in the opening direction, and the exposure is completed by demagnetizing the front-curtain electromagnetic actuator after the exposure time elapses and causing the rear curtains to run in the closing direction.

The first mode and the second mode are able to be switched with each other by the switch unit, and it is preferable that the first mode is set especially at the time of performing the imaging in long exposure. The switch unit may switch between the first mode and the second mode through the operation of the user, and may automatically switch between the first mode and the second mode depending on the exposure time.

In the digital camera according to still another aspect of the present invention, it is preferable that in a case where the curtain running preparation is not completed at the time of performing a completion operation of the exposure, the controller completes the exposure by canceling the inhibition of the running of the front curtains in the closing direction using the front-curtain lock member and causing the front curtains to run in the closing direction by using the biasing force of the return spring. Accordingly, it is possible to perform the imaging even in a situation in which the curtain running preparation is not completed (at the time of abnormal occurrence).

In the digital camera according to still another aspect of the present invention, it is preferable that in a case where the curtain running preparation is not completed at the time of performing the completion operation of the exposure and the running of the front curtains in the closing direction by using the biasing force of the return spring is not possible, the controller completes the exposure by reading out image signals from the imaging element. Accordingly, it is possible to perform the imaging in a situation in which the curtain running preparation is not completed and even in a case where the running of the front curtains in the closing direction is not possible (at the time of abnormal occurrence).

In accordance with the invention according to still another aspect, there is provided a control method of a digital camera that comprises a focal-plane shutter which includes a first front-curtain drive member that fully opens an exposure opening portion by causing front curtains to run in an opening direction through movement in a first direction and fully closes the exposure opening portion by causing the front curtains to run in a closing direction through movement in a second direction opposite to the first direction, a second front-curtain drive member that is biased in the first direction by a front-curtain running spring and abuts on the first front-curtain drive member to move the first front-curtain drive member in the first direction, a return spring that biases the front curtains in the closing direction by using a biasing force weaker than a biasing force of the front-curtain running spring, a rear-curtain drive member that is biased in the first direction by a rear-curtain running spring, the rear-curtain drive member fully closing the exposure opening portion by causing rear curtains to run in a closing direction through movement in the first direction and fully opening the exposure opening portion by causing the rear curtains to run in an opening direction through movement in the second direction, a charging member that moves the second front-curtain drive member and the rear-curtain drive member in the second direction against biasing forces of the front-curtain running spring and the rear-curtain running spring, respectively, and moves the second front-curtain drive member and the rear-curtain drive member to charge positions close to movement ends in the second direction, respectively, a lock mechanism that holds the second front-curtain drive member and the rear-curtain drive member in the charge positions, respectively, in a case where the second front-curtain drive member and the rear-curtain drive member are respectively positioned in the charge positions, a front-curtain lock member that inhibits the running of the front curtains in the closing direction in a case where the front curtains are fully opened, and a front-curtain electromagnetic actuator and a rear-curtain electromagnetic actuator that respectively inhibit the movement of the second front-curtain drive member and the rear-curtain drive member in the first direction using the front-curtain running spring and the rear-curtain running spring in a direct or indirect manner by being electrically conducted in a case where the second front-curtain drive member and the rear-curtain drive member are respectively positioned in the charge positions, an imaging element, and a controller which controls the focal-plane shutter and the imaging element. The control method comprises a step of moving the front-curtain lock member and inhibiting the running of the front curtains in the closing direction, by the controller; a step of fully opening the exposure opening portion by moving the second front-curtain drive member and the rear-curtain drive member in the charge positions, respectively, by the charging member in a state in which the running of the front curtains in the closing direction is inhibited and holding the second front-curtain drive member and the rear-curtain drive member in the charge positions, respectively, by the lock mechanism; a step of performing electronic shutter control for starting exposure by discharging electric charges accumulated in the imaging element in a case where the exposure opening portion is fully opened and a shutter release switch is operated; a step of inhibiting the movement of the rear-curtain drive member in the first direction by magnetizing at least the rear-curtain electromagnetic actuator immediately before the exposure is completed; a step of performing curtain running preparation, by the controller, for canceling the holding of the second front-curtain drive member and the rear-curtain drive member in the charge positions using the lock mechanism after the movement of the rear-curtain drive member is inhibited by the rear-curtain electromagnetic actuator; and a step of completing the exposure by demagnetizing the rear-curtain electromagnetic actuator after the curtain running preparation is ended and causing the rear curtains to run in the closing direction through the rear-curtain drive member by using the biasing force of the rear-curtain running spring.

In the control method of a digital camera according to still another aspect of the present invention, it is preferable that the controller continuously reads out image signals from the imaging element, and enables a live view image to be displayed in a case where the exposure opening portion is fully opened.

The control method of a digital camera according to still another aspect of the present invention further comprises a step of reading out image signals from the imaging element for a period during which the exposure opening portion is fully closed after the exposure is completed in a case of long exposure in which an exposure time is equal to or greater than a predetermined time; a step of reading out noise signals from the imaging element by performing the electronic shutter control for accumulating the electric charges for the same time as a time during which the imaging element is exposed for a period during which the exposure opening portion is fully closed after the image signals are read out; and a step of obtaining image signals from which noise is removed by subtracting the readout noise signals from the readout image signals.

In the control method of a digital camera according to still another aspect of the present invention, it is preferable that the controller discharges the electric charges accumulated in the imaging element according to a reset sequence that simulates running characteristics of the rear curtains in the closing direction in a case where the electronic shutter control is performed.

It is preferable that the control method of a digital camera according to still another aspect of the present invention further comprises a step of determining whether or not an exposure time is equal to or greater than a time required for the curtain running preparation, and a step of completing the curtain running preparation at least before the rear-curtain electromagnetic actuator is demagnetized by setting starting of an operation of the curtain running preparation to be performed earlier than starting of the electronic shutter control in a case where it is determined that the exposure time is less than the time required for the curtain running preparation.

According to the present invention, in the focal-plane shutter capable of performing the normal opening operation, in a case where the shutter release switch is operated, the exposure at the time of imaging the still image is started through the electronic shutter control, the curtain running preparation is performed by inhibiting the running of the rear curtains in the closing direction by magnetizing the rear-curtain electromagnetic actuator immediately before the exposure is completed, and the exposure is completed by demagnetizing the rear-curtain electromagnetic actuator after the curtain running preparation is ended and causing the rear curtains to run in the closing direction. Therefore, it is possible to shorten the electrical conduction time of the rear-curtain electromagnetic actuator, and it is possible to reduce the power consumption.

DESCRIPTION OF THE PREFERRED EMBODIMENTS

Hereinafter, preferred embodiments of a digital camera and a control method of a digital camera according to the present invention will be described with reference to the accompanying drawings.

<External Appearance of Digital Camera>

Figure 1:
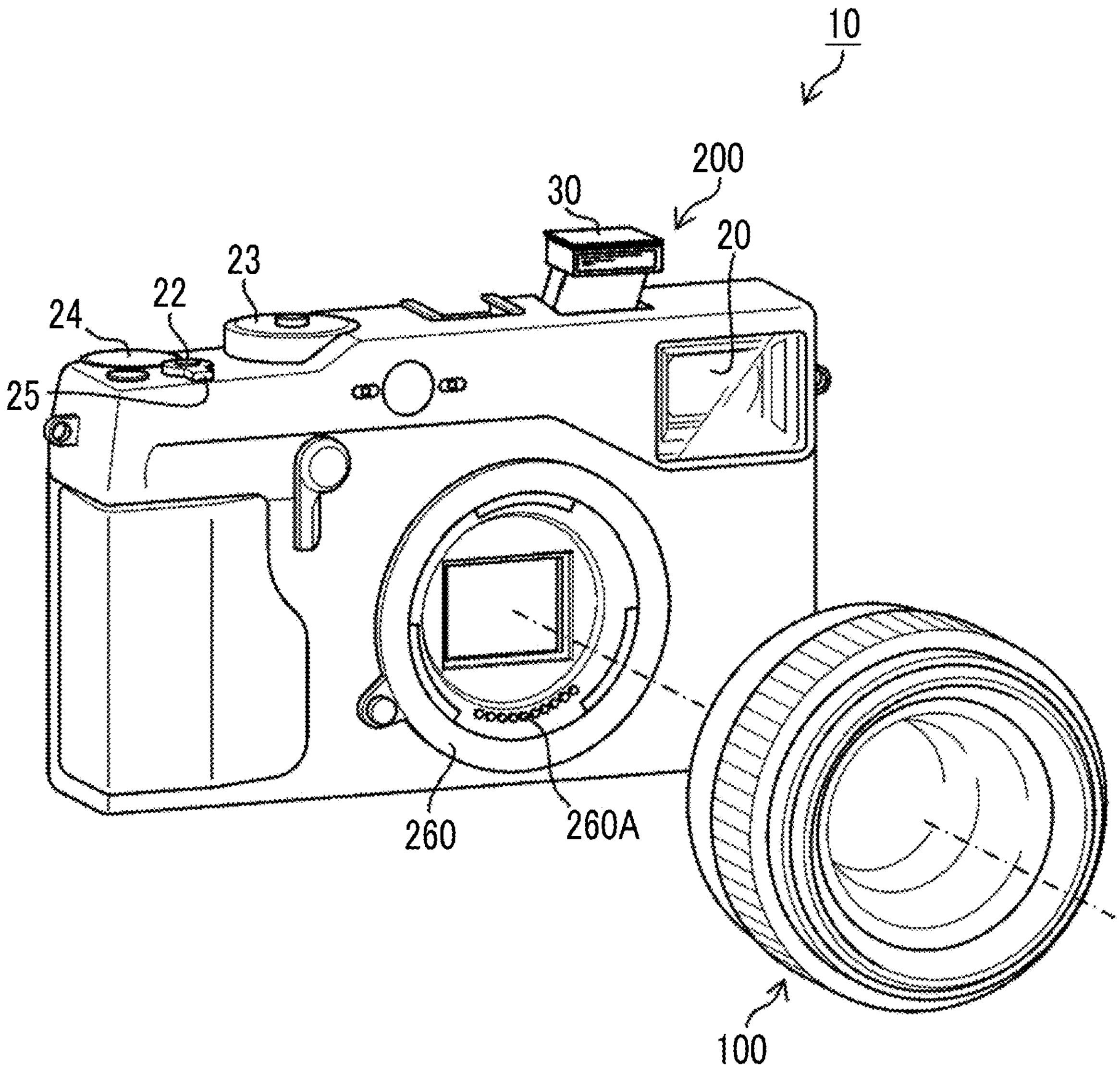
FIG. 1 is a perspective view in a case where a camera system according to the present invention is obliquely viewed from the front.
Figure 2:
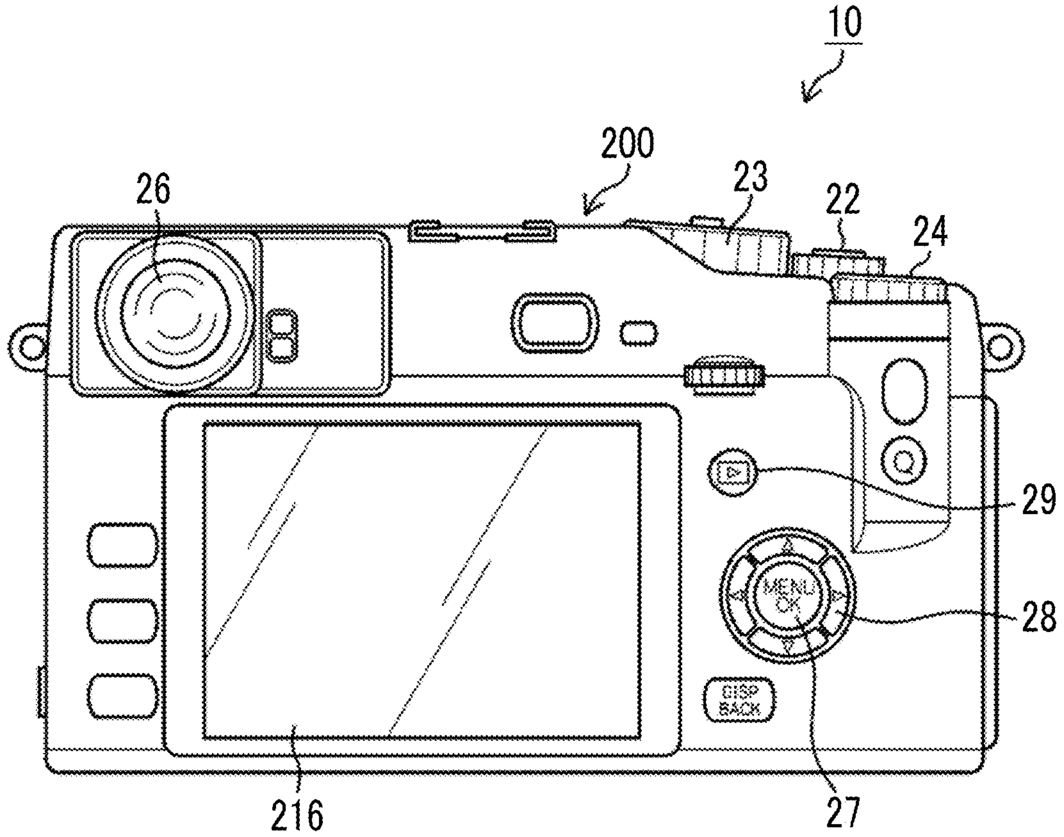
FIG. 2 is a rear view of a camera main body.

FIG. 1 is a perspective view in a case where a digital camera is viewed obliquely from the front, and FIG. 2 is a rear view of the digital camera.

As shown in FIG. 1, a digital camera 10 is a mirrorless digital single-lens camera including an interchangeable lens 100 and a camera main body 200 to and from which the interchangeable lens 100 is attachable and detachable.

In FIG. 1, a main body mount 260 on which the interchangeable lens 100 is mounted and detached and a finder window 20 of an optical finder are provided on a front surface of the camera main body 200. A shutter release switch 22, a shutter speed dial 23, an exposure correction dial 24, a power lever 25, and a built-in flash 30 are mainly provided on an upper surface of the camera main body 200.

As shown in FIG. 2, a monitor 216 which is a liquid crystal display, an eyepiece portion 26 of the optical finder, a MENU and OK key 27, a cross key 28, and a playback button 29 are mainly provided on a rear surface of the camera main body 200.

The monitor 216 functions as a display unit that displays various menu screens in addition to displaying a live view image at the time of an imaging mode or playing an image captured at the time of a playback mode back. The MENU and OK key 27 is an operation key having both a function of a MENU button for instructing that a menu is displayed on a screen of the monitor 216 and a function of an OK button for instructing that a selected content is confirmed and is executed. The cross keys 28 are operation portions for inputting four up, down, left and right directional commands, and function as buttons for selecting an item from the menu screen or instructing that various setting items are selected from each menu. The up key and the down key of the cross key 28 function as zoom switches at the time of imaging or playback zoom switches at the time of the playback mode. The left key and the right key function as frame-by-frame playback (forward and reverse playback) buttons at the time of the playback mode. The playback button 29 is a button that switches from the imaging mode to the playback mode in which a captured and recorded still image or motion picture is displayed on the monitor 216.

<Internal Configuration of Digital Camera>

Figure 3:
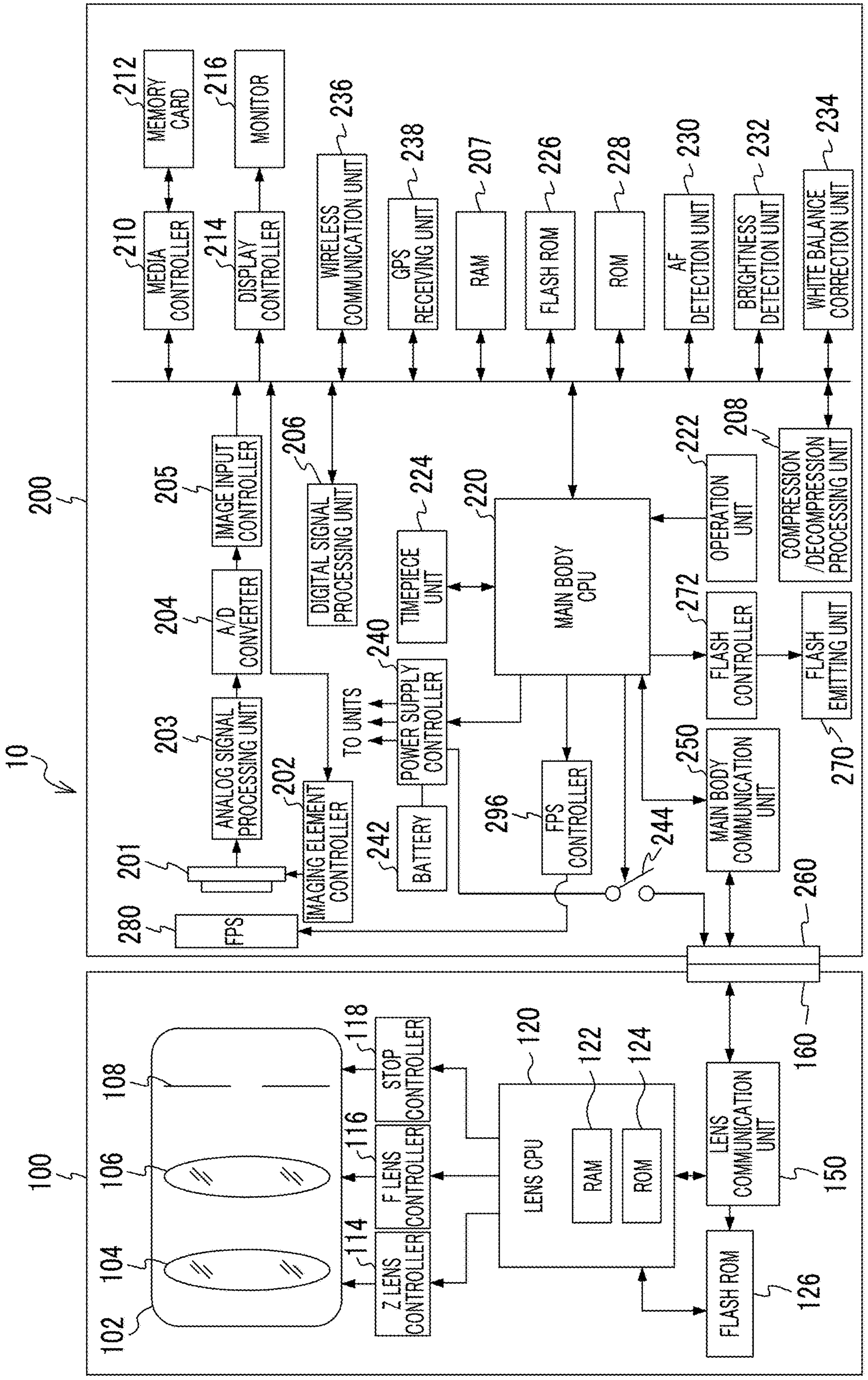
FIG. 3 is a block diagram showing an embodiment of an internal configuration of the camera system.

FIG. 3 is a block diagram showing an embodiment of an internal configuration of the digital camera 10.

[Interchangeable Lens]

The interchangeable lens 100 constituting the digital camera 10 is an interchangeable lens which is manufactured according to a communication standard of the camera main body 200 and is capable of communicating with the camera main body 200 as will be described below. The interchangeable lens 100 comprises an imaging optical system 102, a zoom lens controller 114, a focus lens controller 116, a stop controller 118, a lens central processing unit (CPU) 120 (lens controller), a flash read only memory (ROM) 126, a lens communication unit 150, and a lens mount 160.

The imaging optical system 102 has a plurality of optical members which include a zoom lens 104, a focus lens 106, and a stop 108. The zoom lens controller 114 controls a zoom position of the zoom lens 104 according to a command from the lens CPU 120. The focus lens controller 116 controls a focus position of the focus lens 106 according to a command from the lens CPU 120. The stop controller 118 controls the stop 108 (opening area) according to a command from the lens CPU 120.

The lens CPU 120 generally controls the interchangeable lens 100, and has a ROM 124 and a RAM 122 therein.

The flash ROM 126 is a nonvolatile memory that stores a program downloaded from the camera main body 200.

The lens CPU 120 generally controls the units of the interchangeable lens 100 by using the random access memory (RAM) 122 as a work area according to a control program stored in the ROM 124 or the flash ROM 126.

The lens communication unit 150 communicates with the camera main body 200 through a plurality of signal terminals (lens signal terminals) provided on the lens mount 160 in a state in which the lens mount 160 is mounted on the main body mount 260 of the camera main body 200. That is, the lens communication unit 150 performs the transmission and reception (bidirectional communication) of request signals and response signals to and from a main body communication unit 250 of the camera main body 200 connected through the lens mount 160 and the main body mount 260 according to a command of the lens CPU 120.

The interchangeable lens 100 comprises a detection unit (not shown) that detects lens information items of the optical members of the imaging optical system 102 (zoom information of the zoom lens 104, focus position information of the focus lens 106, and stop information). In this example, the zoom information is information indicating a zoom position, a zoom magnification, or a focal length, and the stop information is information indicating a stop value (F number) or an opening diameter of the stop 108. Hereinafter, the F number is used as the stop information in the present example.

It is preferable that the lens CPU 120 retains detected various lens information items in the RAM 122 in order to respond to requests of the lens information items from the camera main body 200. The lens information of each optical member may be detected in a case where a request for the lens information from the camera main body 200 is received, may be detected in a case where the optical member is driven, or may be detected with a predetermined cycle (a cycle sufficiently shorter than a frame cycle of the motion picture), and the detected result may be retained as the lens information.

[Camera Main Body]

The camera main body 200 constituting the digital camera 10 comprises an imaging element (imaging unit) 201, an imaging element controller 202, an analog signal processing unit 203, an analog/digital (A/D) converter 204, an image input controller 205, a digital signal processing unit 206, a RAM 207, a compression/decompression processing unit 208, a media controller 210, a memory card 212, a display controller 214, the monitor 216, a main body CPU 220, an operation unit 222, a timepiece unit 224, a flash ROM 226, a ROM 228, an AF detection unit 230, a brightness detection unit 232, a white balance correction unit 234, a wireless communication unit 236, a global positioning system (GPS) receiving unit 238, a power supply controller 240, a battery 242, a main body communication unit 250, the main body mount 260, a flash emitting unit 270 constituting a built-in flash 30 (FIG. 1), a flash controller 272, a focal-plane shutter (FPS) 280, and an FPS controller 296.

The imaging element 201 is constituted by a complementary metal-oxide semiconductor (CMOS) type color image sensor. The imaging element 201 is not limited to the CMOS type, and may be an XY address type or charge coupled device (CCD) type image sensor.

The imaging element 201 is constituted by a plurality of pixels arranged in a matrix form such as a predetermined pattern array (Bayer array, X-Trans (registered trademark) array, or honeycomb array), and each pixel includes a microlens, a red (R), green (G), or blue (B) color filter, and a photoelectric conversion section (photodiode).

An optical image of a subject formed on a light receiving surface of the imaging element 201 by the imaging optical system 102 of the interchangeable lens 100 is converted into electrical signals by the imaging element 201. That is, each pixel of the imaging element 201 accumulates electric charges corresponding to an incident light amount, and an electric signal corresponding to the amount of electric charges accumulated in each pixel is read out as an image signal from the imaging element 201.

The imaging element controller 202 performs read-out control of the image signals from the imaging element 201 according to a command from the main body CPU 220. The imaging element controller 202 has an electronic shutter function of starting exposure by simultaneously discharging the electric charges accumulated in each pixel of the imaging element 201 (by resetting the electric charges all at once) by using an electronic shutter control signal from the main body CPU 220.

The analog signal processing unit 203 performs various analog signal processing on analog image signals obtained by imaging the subject by using the imaging element 201. The analog signal processing unit 203 includes a sampling and holding circuit, a color separation circuit, and an AGC circuit. The AGC circuit functions as a sensitivity adjusting unit that adjusts sensitivity (ISO sensitivity (International Organization for Standardization)) at the time of imaging, and adjusts a gain of an amplifier that amplifies an input image signal such that a signal level of the image signal is within an appropriate range. The A/D converter 204 converts the analog image signals output from the analog signal processing unit 203 into digital image signals.

Image data (mosaic image data) for each of the RGB pixels output through the imaging element 201, the analog signal processing unit 203, and the A/D converter 204 at the time of imaging the still image or the motion picture is input to the RAM 207 from the image input controller 205, and is temporarily stored. In a case where the imaging element 201 is the CMOS type imaging element, the analog signal processing unit 203 and the A/D converter 204 are built in the imaging element 201 in many cases.

The digital signal processing unit 206 performs various digital signal processing on the image data items stored in the RAM 207. The digital signal processing unit 206 of the present example appropriately reads out the image data items stored in the RAM 207, performs digital signal processing such as offset processing, gain control processing including sensitivity correction, gamma-correction processing, demosaic processing (also referred to as demosaicing process), or RGB/YCrCb conversion processing on the readout image data items, and stores the image data items obtained through the digital signal processing in the RAM

207 again. For example, in a case where the imaging element is constituted by the three RGB color filters, the demosaic processing is processing for calculating color information items of all RGB colors for pixels from a mosaic image constituted by RGB colors, and image data of three RGB faces demosaiced from the mosaic data (point-sequential RGB data) is generated.

The RGB/YCrCb conversion processing is processing for converting the demosaiced RGB data into brightness data (Y) and color difference data items (Cr, Cb).

The compression/decompression processing unit 208 performs compression processing on uncompressed brightness data and color difference data items Cb and Cr stored in the RAM 207 once at the time of recording the still image or the motion picture. The still image is compressed in, for example, a Joint Photographic Coding Experts Group (JPEG) format, and the motion picture is compressed in, for example, an H.264 format. The image data compressed by the compression/decompression processing unit 208 is recorded in the memory card 212 through the media controller 210. The compression/decompression processing unit 208 performs decompression processing on the compressed image data obtained from the memory card 212 through the media controller 210 at the time of the playback mode, and generates the uncompressed image data.

The media controller 210 performs control for recording the image data compressed by the compression/decompression processing unit 208 in the memory card 212. The media controller 210 performs control for reading out the compressed image data from the memory card 212.

The display controller 214 performs control for displaying the uncompressed image data stored in the RAM 207 on the monitor 216. For example, the monitor 216 is constituted by a liquid crystal display device, an organic electroluminescence display device.

In a case where the live view image is displayed on the monitor 216, the digital image signals continuously generated by the digital signal processing unit 206 are temporarily stored in the RAM 207. The display controller 214 converts the digital image signal temporarily stored in the RAM 207 so as to be in a display signal format, and sequentially outputs the converted signals to the monitor 216. Accordingly, the captured image is displayed on the monitor 216 in real time, and thus, the monitor 216 can be used as an electronic view finder.

The shutter release switch 22 is operation means for inputting an imaging start command, and is constituted by a so-called two-step stroke type switch including “half pushing” and “fully pushing”.

In the case of a still image imaging mode, the shutter release switch 22 is half pushed, and thus, an S1-on signal is output. Thereafter, the shutter release switch is fully pushed by being further pushed while being half pushed, and thus, an S2-on signal is output. The main body CPU 220 performs imaging preparation such as automatic focus adjustment (AF processing) and automatic exposure control (AE processing) in a case where the S1-on signal is output, and performs the imaging and recording of the still image in a case where the S2-on signal is output. Of course, the AF processing and the AE processing are automatically performed in a case where an auto mode is set by the operation unit 222, and the AF processing and the AE processing are not performed in a case where a manual mode is set.

In the case of a motion picture imaging mode, the shutter release switch 22 is fully pushed, and thus, the S2-on signal is output. In this case, the camera main body 200 enters a motion picture recording mode in which the recording of the motion picture is started, and the image processing and recording of the motion picture are performed. Thereafter, the shutter release switch 22 is fully pushed again, and thus, the S2-on signal is output. In this case, the camera main body 200 enters a standby state, and temporarily stops the recording of the motion picture.

The shutter release switch 22 is not limited to a two-step stroke type switch including “half pushing” and “fully pushing”. The S1-on signal or the S2-on signal may be output by pushing the shutter release switch once. Alternatively, individual switches may be provided, and the S1-on signal or the S2-on signal may be output.

As a form in which an operation command is performed by a touch panel, the operation command may be output by touching a region corresponding to the operation command displayed on a screen of the touch panel as the operation means. As a form of the operation means is not limited thereto as long as the operation means instructs that the imaging preparation or the imaging is performed.

The still image or the motion picture obtained through the imaging is compressed by the compression/decompression processing unit 208. The compressed image data is rendered to an image file obtained by adding required additional information such as an imaging date and time, GPS information, and an imaging condition (F number, shutter speed, or ISO sensitivity), and is stored in the memory card 212 through the media controller 210.

The main body CPU 220 generally controls the overall operation of the camera main body 200 and the driving of the optical members of the interchangeable lens 100, and controls the units of the camera main body 200 and the interchangeable lens 100 based on an input from the operation unit 222 including the shutter release switch 22.

The timepiece unit 224 functions as a timer, and measures a time based on a command from the main body CPU 220. The timepiece unit 224 functions as a counter, and measures the current date and time.

The flash ROM 226 is a readable and writable nonvolatile memory, and stores setting information.

A camera control program executed by the main body CPU 220, defect information of the imaging element 201, various parameters or tables used in the image processing are stored in the ROM 228. The main body CPU 220 controls the units of the camera main body 200 by using the RAM 207 as a work area and the interchangeable lens 100 according to the camera control program stored in the ROM 228.

The AF detection unit 230 calculates a value required for AF control based on the digital image signals. For example, in the case of so-called contrast AF, an accumulative value (focus evaluation value) of high-frequency components of G signals within a predetermined AF area is calculated. The main body CPU 220 moves the focus lens 106 to a position (that is, a position in which the contrast is maximum) in which the focus evaluation value is maximum at the time of the AF control. AF is not limited to the contrast AF. For example, a defocus amount may be detected based on pixel data items of phase-difference detecting pixel formed in the imaging element, and phase difference AF for moving the focus lens 106 may be performed such that the defocus amount is zero.

The brightness detection unit 232 is a portion that detects the brightness (subject brightness) of the subject, and calculates a value (exposure value (EV value)) required for the AE control corresponding to the subject brightness. The main body CPU 220 determines the F number, the shutter speed, and the ISO sensitivity from a predetermined program diagram based on the EV value obtained from the brightness detection unit 232 at the time of the AE control.

The white balance correction unit 234 performs white balance correction by calculating white balance (WB) gains Gr, Gg, and Gb of color data items of RGB data items (R data, G data, and B data) and multiplying the R data, the G data, and the B data by the calculated WB gains Gr, Gg, and Gb. In this example, a method of specifying the kind of a light source that illuminates the subject based on the brightness (EV value) of the subject and a color temperature of ambient light and reading out the WB gains corresponding to the kind of the light source specified from a storage unit that stores appropriate WB gains for kinds of light sources is considered as the calculation method of the WB gains Gr, Gg, and Gb. However, other known methods of obtaining the WB gains Gr, Gg, and Gb by using at least the EV value are considered.

The wireless communication unit 236 is a portion that performs short-range wireless communication having a standard such as wireless fidelity (Wi-Fi) or Bluetooth (registered trademark), and transmits and receives necessary information to and from a peripheral digital device (mobile terminal such as a smartphone).

The GPS receiving unit 238 receives GPS signals transmitted from a plurality of GPS satellites according to a command of the main body CPU 220, performs positioning calculation processing based on a plurality of received GPS signals, and obtains GPS information including latitude, longitude, and altitude of the camera main body 200. The obtained GPS information may be recorded in a header of an image file, as additional information indicating an imaging position of the captured image.

The power supply controller 240 applies a power supply voltage supplied from the battery 242 to the units of the camera main body 200 according to a command of the main body CPU 220. The power supply controller 240 applies a power supply voltage supplied from the battery 242 to the units of the interchangeable lens 100 through the main body mount 260 and the lens mount 160 according to a command of the main body CPU 220.

A lens power supply switch 244 switches between the turning-on and turning-off of the power supply voltage applied to the interchangeable lens 100 through the main body mount 260 and the lens mount 160 and switches between the levels according to a command of the main body CPU 220.

The main body communication unit 250 performs the transmission and reception (bidirectional communication) of request signals and response signals to and from the lens communication unit 150 of the interchangeable lens 100 connected through the main body mount 260 and the lens mount 160 according to a command of the main body CPU 220. In a case where a plurality of terminals 260A is provided on the main body mount 260 as shown in FIG. 1 and the interchangeable lens 100 is mounted on the camera main body 200 (the lens mount 160 and the main body mount 260 are connected to each other), the plurality of terminals 260A (FIG. 1) provided on the main body mount 260 and a plurality of terminals (not shown) provided on the lens mount 160 are electrically connected to each other, and thus, bidirectional communication is able to be performed between the main body communication unit 250 and the lens communication unit 150.

The built-in flash 30 (FIG. 1) is a through-the-lens (TTL) auto-dimming flash, and includes the flash emitting unit 270 and the flash controller 272.

The flash controller 272 has a function of adjusting a light emitting amount (guide number) of flash light emitted from the flash emitting unit 270. That is, the flash controller 272 causes the flash emitting unit 270 to emit light in synchronization with a flash imaging command from the main body CPU 220, starts the photometry of reflection light (including ambient light) incident through the imaging optical system 102 of the interchangeable lens 100, and stops the emission of the flash light from the flash emitting unit 270 in a case where a photometric value reaches a standard exposure value.

[Focal-Plane Shutter]

The focal-plane shutter 280 constitutes a mechanical shutter of the digital camera 10, and is disposed immediately in front of the imaging element 201. The focal-plane shutter 280 is a focal-plane shutter (a focal-plane shutter capable of switching between a normal opening operation and a normal closing operation) capable of holding an exposure opening portion in an opened state in a charge state of the focal-plane shutter 280 as will be described below.

Figure 4:
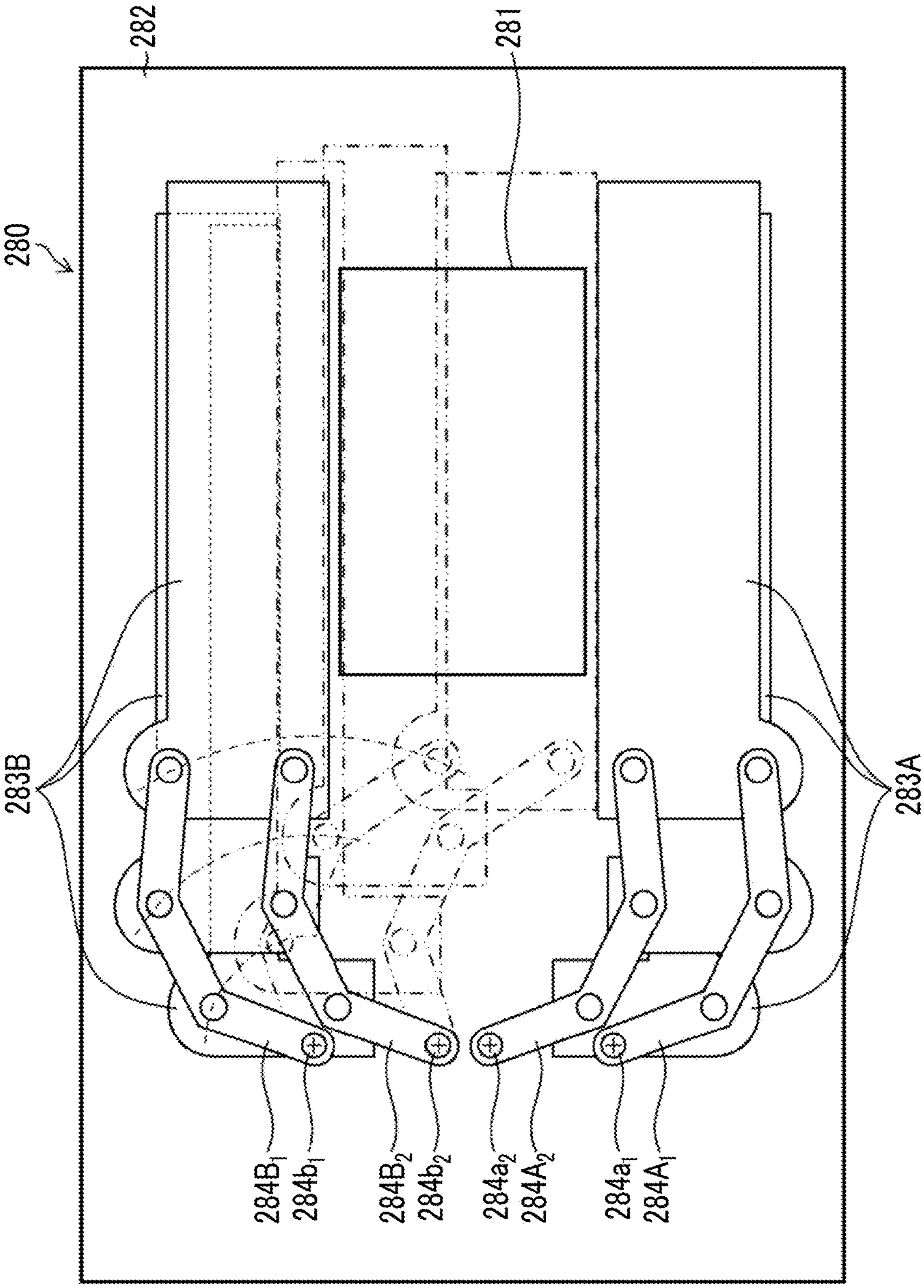
FIG. 4 is a front view showing a schematic configuration of a square focal-plane shutter.
Figure 5:
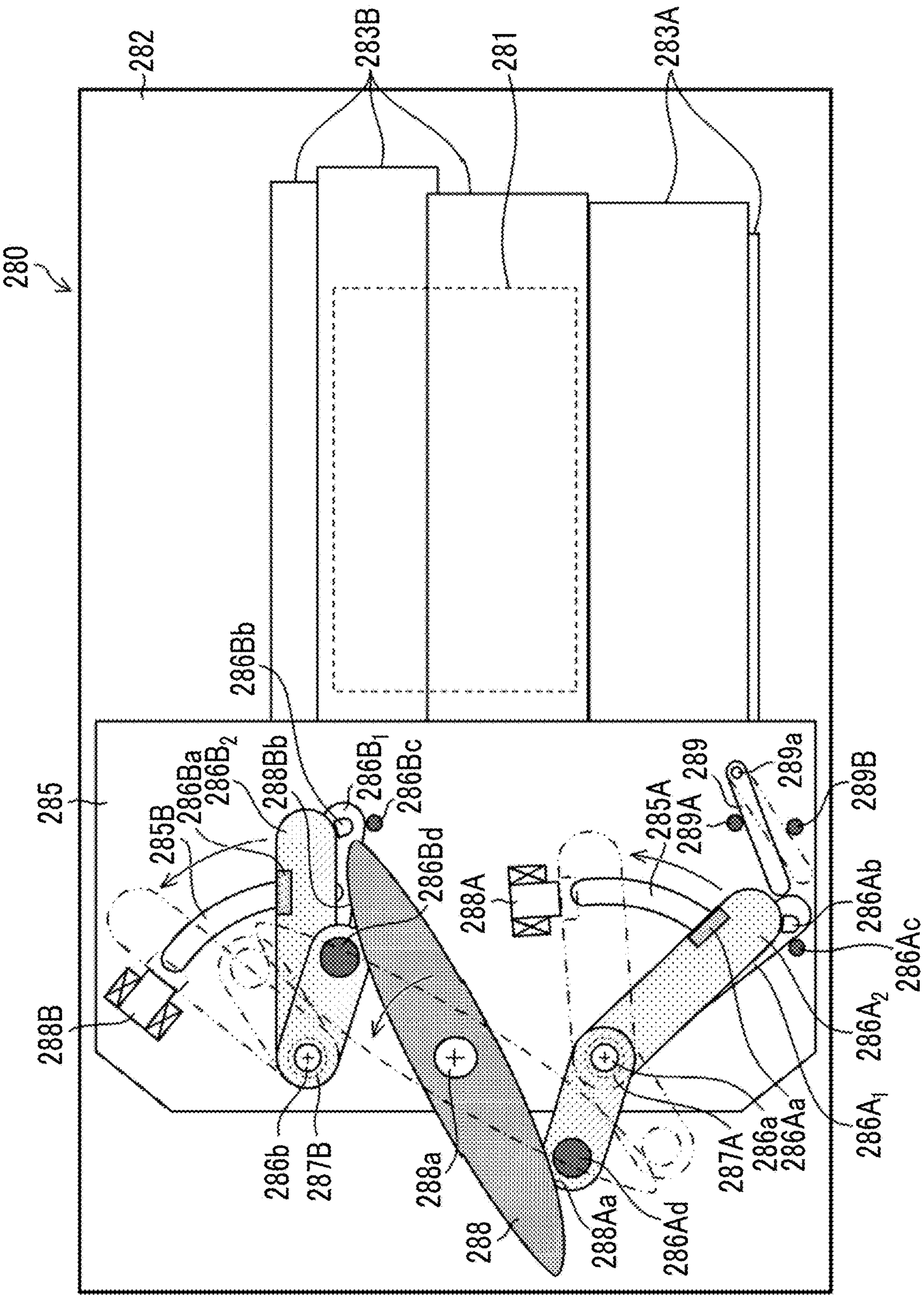
FIG. 5 is another front view showing the schematic configuration of a square focal-plane shutter.

FIGS. 4 and 5 are front views showing schematic configurations of a square focal-plane shutter 280.

FIG. 4 mainly shows front curtains 283A and rear curtains 283B constituted by a plurality of shutter blades (in the example, three shutter blades), front-curtain drive arms 284$A_1$ and 284$A_2$ and rear-curtain drive arms 284$B_1$ and 284$B_2$. In FIG. 4, a state (a fully opened state) in which the front curtains 283A and the rear curtains 283B are opened is shown. Dashed double-dotted lines shown in FIG. 4 depict a state in which the exposure opening portion 281 is fully closed by the rear curtains 283B.

The front-curtain drive arms 284$A_1$ and 284$A_2$ and the rear-curtain drive arms 284$B_1$ and 284$B_2$ are rotatably arranged on a shutter ground plate 282 in which the exposure opening portion 281 is formed on by spindles 284$a_1$, 284$a_2$, 284$b_1$, and 284$b_2$. The front curtains 283A constituted by the three shutter blades are disposed on the front-curtain drive arms 284$A_1$ and 284$A_2$, and the rear curtains 283B constituted by the three shutter blades are similarly arranged on the rear-curtain drive arms 284$B_1$ and 284$B_2$.

The front-curtain drive arms 284$A_1$ and 284$A_2$ and the shutter blades of the front curtains 283A constitute a parallel link mechanism, and the shutter blades of the front curtains 283A open and close the exposure opening portion 281 while maintaining the front-curtain drive arms 284$A_1$ and 284$A_2$ in a parallel state at the time of rotational movement. The front curtains 283A run in an opening direction (first direction) in a case where the front-curtain drive arms 284$A_1$ and 284$A_2$ are rotated in a clockwise direction in FIG. 4, and the front curtains 283A run in a closing direction (second direction) in a case where the front-curtain drive arms are rotated in a counterclockwise direction.

Similarly, the rear-curtain drive arms 284$B_1$ and 284$B_2$ and the shutter blades of the rear curtains 283B constitute a parallel link mechanism, and the shutter blades of the rear curtains 283B open the exposure opening portion 281 while maintaining the rear-curtain drive arms 284$B_1$ and 284$B_2$ in a parallel state at the time of rotational movement. The rear curtains 283B run in a closing direction (first direction) in a case where the rear-curtain drive arms 284$B_1$ and 284$B_2$ are rotated in the clockwise direction in FIG. 4, and the rear curtains 283B run in an opening direction (second direction) in a case where the rear-curtain drive arms are rotated in the counterclockwise direction. The opening direction (first direction) of the front curtains 283A and the opening direction (second direction) of the rear curtains 283B are opposite to each other.

FIG. 5 mainly shows a drive mechanism that drives the front curtains 283A (front-curtain drive arm 284$A_1$) and the rear curtains 283B (rear-curtain drive arm 284$B_1$).

In FIG. 5, a base plate 285 is disposed so as to be spaced from the shutter ground plate 282 at a predetermined distance above the shutter ground plate 282. A first front-curtain drive lever 286$A_1$ and a second front-curtain drive lever 286$A_2$ functioning as a first front-curtain drive member and a second front-curtain drive member, a first rear-curtain drive lever 286$B_1$ and a second rear-curtain drive lever 286$B_2$ functioning as rear-curtain drive members, a charging member 288, a front-curtain electromagnet 288A and a rear-curtain electromagnet 288B functioning as a front-curtain electromagnetic actuator and a rear-curtain electromagnetic actuator, and a front-curtain lock lever 289 functioning as a front-curtain lock member are arranged on the base plate 285.

The first front-curtain drive lever 286$A_1$ and the second front-curtain drive lever 286$A_2$ are rotatably arranged by a spindle 286*a* having the same axis as that of the spindle 284*a*$_1$ of the front-curtain drive arm 284$A_1$.

A return spring (not shown) and a front-curtain running spring 287A into which a coil portion of a torsion coil spring is inserted are arranged on the spindle 286*a*. The second front-curtain drive lever 286$A_2$ is biased by the front-curtain running spring 287A in the clockwise direction (the first direction in which the front curtains 283A are opened) in FIG. 5, and the first front-curtain drive lever 286$A_1$ is biased by the return spring in the counterclockwise direction.

A magnetic piece 286Aa is attracted and held by the front-curtain electromagnet 288A is provided on the second front-curtain drive lever 286$A_2$, an abutment pin 286Ab on which a distal end portion of the second front-curtain drive lever 286$A_2$ abuts is provided in the first front-curtain drive lever 286$A_1$, and a stopper 286Ac on which the first front-curtain drive lever 286$A_1$ abuts is provided on the base plate 285.

In this example, in a case where a biasing force of the return spring is weaker than a biasing force of the front-curtain running spring 287A, the second front-curtain drive lever 286$A_2$ is not attracted and held by the front-curtain electromagnet 288A, and a rotation drive force exerted in the counterclockwise direction from the charging member 288 is not transmitted (the state shown in FIG. 5), the first front-curtain drive lever 286$A_1$ and the second front-curtain drive lever 286$A_2$ are moved to rotational movement ends (movement ends) by using the biasing force of the front-curtain running spring 287A in the clockwise direction.

A drive pin 286Ae (FIG. 8) connected with the front-curtain drive arm 284$A_1$ through a long hole 285A formed in the base plate 285 is provided at the first front-curtain drive lever 286$A_1$, and the first front-curtain drive lever 286$A_1$ is rotated. Thus, the front curtains 283A can be opened and closed through the drive pin 286Ae and the front-curtain drive arm 284$A_1$. In the state shown in FIG. 5, since the first front-curtain drive lever 286$A_1$ is moved to a rotational movement end in the clockwise direction, the front curtains 283A enter the fully opened state.

Similarly, the first rear-curtain drive lever 286$B_1$ and the second rear-curtain drive lever 286$B_2$ are rotatably arranged by spindle 286*b* having the same axis as that of the spindle 284*b*$_1$ of the rear-curtain drive arm 284$B_1$.

A return spring (not shown) and a rear-curtain running spring 287B into which a coil portion of a torsion coil spring is inserted are arranged on the spindle 286*b*, the second rear-curtain drive lever 286$B_2$ is biased by the rear-curtain running spring 287B in the clockwise direction (the first direction in which the rear curtains 283B are closed) in FIG. 5, and the first rear-curtain drive lever 286$B_1$ is biased by the return spring in the counterclockwise direction.

A magnetic piece 286Ba attracted and held by the rear-curtain electromagnet 288B is provided on the second rear-curtain drive lever 286$B_2$, an abutment pin 286Bb on which a distal end of the second rear-curtain drive lever 286$B_2$ abuts is provided on the first rear-curtain drive lever 286$B_1$, and a stopper 286Bc on which the first rear-curtain drive lever 286$B_1$ abuts is provided on the base plate 285.

In this example, in a case where a biasing force of the return spring is weaker than a biasing force of the rear-curtain running spring 287B, the second rear-curtain drive lever 286$B_2$ is not attracted and held by the rear-curtain electromagnet 288B, and a rotation drive force exerted in the counterclockwise direction from the charging member 288 is not transmitted (the state shown in FIG. 5), the first rear-curtain drive lever 286$B_1$ and the second rear-curtain drive lever 286$B_2$ are moved to rotational movement ends (movement ends) in the clockwise direction by using the biasing force of the rear-curtain running spring 287B.

A drive pin 286Be (FIG. 8) connected with the rear-curtain drive arm 284$B_1$ through a long hole 285B formed in the base plate 285 is provided on the first rear-curtain drive lever 286$B_1$, and the first rear-curtain drive lever 286$B_1$ is rotated. Thus, the rear curtains 283B can be opened and closed through the drive pin 286Be and the rear-curtain drive arm 284$B_1$. In the state shown in FIG. 5, since the first rear-curtain drive lever 286$B_1$ is moved to a rotational movement end in the clockwise direction, the rear curtains 283B enter the fully closed state.

The charging member 288 is constituted by a cam member rotated around a spindle 288*a*, and a cam surface 288Aa coming in contact with a cam follower 286Ad provided on the second front-curtain drive lever 286$A_2$ and a cam surface 288Bb coming in contact with a cam follower 286Bd provided on the second rear-curtain drive lever 286$B_2$ are formed.

Figure 6:
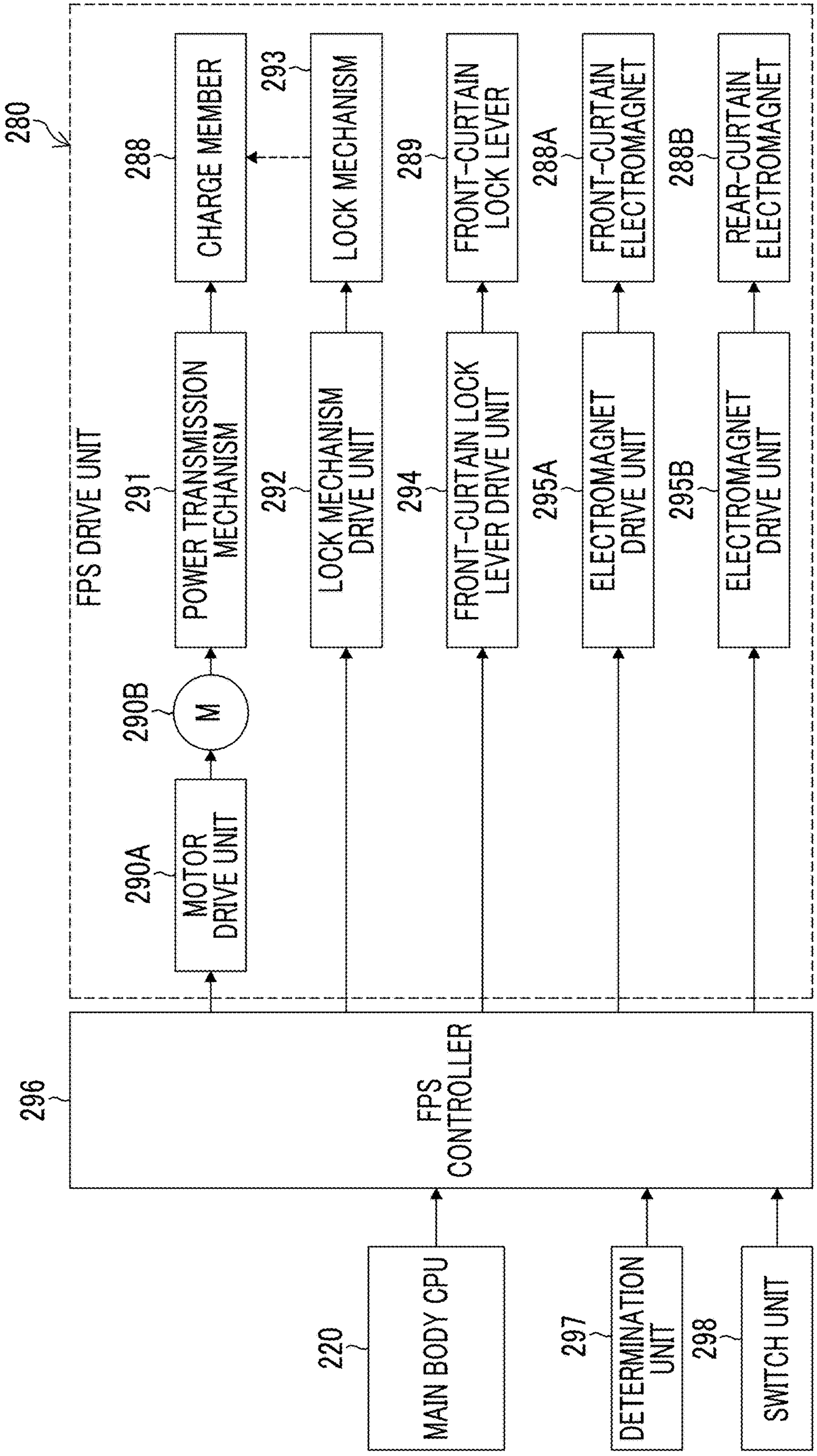
FIG. 6 is a block diagram mainly showing an FPS drive unit and an FPS controller of the focal-plane shutter.

A rotation drive force is transmitted to the charging member 288 from a charge motor 290B shown in FIG. 6 through a power transmission mechanism 291 such as a deceleration gear, and the charging member 288 is rotated in the counterclockwise direction or the clockwise direction in FIG. 5. In a case where the charging member 288 is rotated in the counterclockwise direction, it is possible to rotate the second front-curtain drive lever 286$A_2$ and the second rear-curtain drive lever 286$B_2$ in the counterclockwise direction against the biasing forces of the front-curtain running spring 287A and the rear-curtain running spring 287B. Accordingly, it is possible to move the second front-curtain drive lever 286$A_2$ and the second rear-curtain drive lever 286$B_2$ to charge positions close to the movement ends in the counterclockwise direction (positions in which the magnetic pieces 286Aa and 286Ba provided on the second front-curtain drive lever 286$A_2$ and the second rear-curtain drive lever 286$B_2$ abut on the front-curtain electromagnet 288A and the rear-curtain electromagnet 288B).

In a case where the second front-curtain drive lever 286$A_2$ and the second rear-curtain drive lever 286$B_2$ are respectively positioned in the charge positions, the front-curtain electromagnet 288A and the rear-curtain electromagnet 288B attract the magnetic pieces 286Aa and 286Ba of the second front-curtain drive lever 286$A_2$ and the second rear-curtain drive lever 286$B_2$ by being electrically conducted, and hold the second front-curtain drive lever 286$A_2$ and the second rear-curtain drive lever 286$B_2$ against the biasing forces of the front-curtain running spring 287A and the rear-curtain running spring 287B.

Although the front-curtain electromagnet 288A and the rear-curtain electromagnet 288B of the present example are direct types that attract and hold the magnetic pieces 286Aa and 286Ba of the second front-curtain drive lever 286$A_2$ and the second rear-curtain drive lever 286$B_2$ through electromagnetic force, the present invention is not limited thereto. The front-curtain electromagnet and the rear-curtain electromagnet may be locking types that hold the second front-curtain drive lever 286$A_2$ and the second rear-curtain drive lever 286$B_2$ in the charge positions by locking lock members respectively driven by the front-curtain electromagnetic actuator and the rear-curtain electromagnetic actuator into the second front-curtain drive lever 286$A_2$ and the second rear-curtain drive lever 286$B_2$.

The electromagnetic actuators are not limited to the electromagnetic actuators (electromagnets) to be applied to the direct types. In the case of the electromagnetic actuator (for example, solenoid) to be applied to the locking types, it is necessary to continue to electrically conduct the front-curtain electromagnetic actuator and the rear-curtain electromagnetic actuator in a case where the second front-curtain drive lever 286$A_2$ and the second rear-curtain drive lever 286$B_2$ are held in the charge positions. Any electromagnetic actuators may be used as long as the front-curtain electromagnetic actuator and the rear-curtain electromagnetic actuator that directly or indirectly hold the second front-curtain drive lever 286$A_2$ and the second rear-curtain drive lever 286$B_2$ in the charge positions by being electrically conducted.

In a case where the front curtains 283A are fully opened as shown in FIG. 5 (the first front-curtain drive lever 286$A_1$ abuts on the stopper 286Ac), the front-curtain lock lever 289 is a lever that inhibits the front curtains 283A from running in the closing direction (the first front-curtain drive lever 286$A_1$ from being rotated in the counterclockwise direction), and is a constituent member for causing the focal-plane shutter 280 to perform the normal opening operation.

The front-curtain lock lever 289 of the present example is rotatably disposed around the spindle 289*a*, and is movable to a position so as to abut on any one of the stopper 289A or 289B provided on the base plate 285. In a case where the front-curtain lock lever 289 is positioned so as to abut on the stopper 289A, the front-curtain lock lever 289 abuts on the first front-curtain drive lever 286$A_1$, and inhibits the first front-curtain drive lever 286$A_1$ from being rotated in the counterclockwise direction.

Accordingly, the focal-plane shutter 280 can perform the normal opening operation for holding the exposure opening portion 281 in the opened state in the charge state of the focal-plane shutter.

Meanwhile, in a case where the front-curtain lock lever 289 is positioned so as to abut on the stopper 289B, the inhibition of the rotational movement of the first front-curtain drive lever 286$A_1$ using the front-curtain lock lever 289 is canceled.

Accordingly, the focal-plane shutter 280 can perform the normal closing operation for holding the exposure opening portion 281 in the closed state in the charge state of the focal-plane shutter.

The front-curtain lock lever 289 is driven by a front-curtain lock lever drive unit 294 (FIG. 6) to be described below. However, in a case where the front-curtain lock lever 289 is driven until the front-curtain lock lever abuts on the stopper 289A or 289B, it is preferable that the front-curtain lock lever 289 is stably held in two states in which the front-curtain lock lever abuts on the stopper 289A or 289B by a click mechanism or a permanent magnet.

FIG. 6 is a block diagram mainly showing an FPS drive unit of the focal-plane shutter 280 and an FPS controller 296.

The FPS drive unit of the focal-plane shutter 280 comprises a motor drive unit 290A, a charge motor 290B, a power transmission mechanism 291, a lock mechanism drive unit 292, a lock mechanism 293, a front-curtain lock lever drive unit, and electromagnet drive units 295A and 295B, in addition to the charging member 288, the front-curtain lock lever 289, the front-curtain electromagnet 288A, and the rear-curtain electromagnet 288B described above.

The FPS controller 296 is a portion that outputs control signals to the drive units of the FPS drive unit based on a command input from the main body CPU 220, a determination unit 297, and a switch unit 298.

In a case where the focal-plane shutter 280 performs a charge operation, the FPS controller 296 outputs a control signal for rotating the charge motor 290B to the motor drive unit 290A in a forward or reverse direction, and drives the charge motor 290B through the motor drive unit 290A. A rotation drive force of the charge motor 290B is transmitted to the charging member 288 through the power transmission mechanism 291 such as the deceleration gear. As a result, the charging member 288 is rotated against the biasing forces of the front-curtain running spring 287A and the rear-curtain running spring 287B, and the second front-curtain drive lever 286$A_2$ and the second rear-curtain drive lever 286$B_2$ are moved to the charge positions.

The lock mechanism drive unit 292 and the lock mechanism 293 are portions that fix (lock) the second front-curtain drive lever 286$A_2$ and the second rear-curtain drive lever 286$B_2$ moved to the charge positions in the charge positions. For example, the lock mechanism 293 engages with the charging member 288 or the second front-curtain drive lever 286$A_2$ and the second rear-curtain drive lever 286$B_2$, and inhibits the rotational movement of the charging member 288 or inhibits the rotational movement of the second front-curtain drive lever 286$A_2$ and the second rear-curtain drive lever 286$B_2$. Accordingly, the second front-curtain drive lever 286$A_2$ and the second rear-curtain drive lever 286$B_2$ moved to the charge positions are locked.

The lock mechanism drive unit 292 is a drive unit that drives the lock mechanism 293 based on a control signal from the FPS controller 296 and locks or unlocks the second front-curtain drive lever and the second rear-curtain drive lever, and consumes power only in a case where the lock mechanism 293 is driven.

The charge motor 290B may function as the lock mechanism instead of the independent lock mechanisms such as the lock mechanism drive unit 292 and the lock mechanism 293. That is, the motor drive unit 290A, the charge motor 290B, the power transmission mechanism 291, and the charging member in a state in which a predetermined torque is generated from the charge motor 290B such that the second front-curtain drive lever 286$A_2$ and the second rear-curtain drive lever 286$B_2$ are held in the charge positions may function as lock mechanisms that lock the second front-curtain drive lever 286$A_2$ and the second rear-curtain drive lever 286$B_2$ in the charge positions.

The front-curtain lock lever drive unit 294 and the front-curtain lock lever 289 are controlled in a case where the focal-plane shutter 280 performs the normal opening operation in order to image and display the live view image. That is, in a case where the focal-plane shutter 280 performs the normal opening operation and the front-curtain lock lever 289 is positioned in an unlocked position (a position in which the front-curtain lock lever 289 abuts on the stopper 289B), the FPS controller 296 outputs a control signal for moving the front-curtain lock lever 289 to a locked position (a position in which the front-curtain lock lever 289 abuts on the stopper 289A) to the front-curtain lock lever drive unit 294, and moves the front-curtain lock lever 289 to the locked position by the front-curtain lock lever drive unit 294. Accordingly, at the time of causing the focal-plane shutter 280 to perform the charge operation, even though the second front-curtain drive lever 286$A_2$ is rotated in the counterclockwise direction and is moved to the charge position, the rotational movement of the first front-curtain drive lever 286$A_1$ in the counterclockwise direction (the running of the front curtains 283A in the closing direction) is inhibited by the front-curtain lock lever 289, and thus, it is possible to hold the exposure opening portion 281 in the fully opened state.

In a case where the front-curtain lock lever 289 positioned in the locked position is moved to the unlocked position, the FPS controller 296 outputs a control signal for moving the front-curtain lock lever 289 to the unlocked position to the front-curtain lock lever drive unit 294, and moves the front-curtain lock lever 289 to the unlocked position by the front-curtain lock lever drive unit 294. Accordingly, since the inhibition of the rotational movement of the first front-curtain drive lever 286$A_1$ in the counterclockwise direction using the front-curtain lock lever 289 is canceled, in a case where the abutment pin 286Ab of the first front-curtain drive lever 286$A_1$ does not abut on the second front-curtain drive lever 286$A_2$ (a case where the second front-curtain drive lever 286$A_2$ is moved to the charge position), the first front-curtain drive lever 286$A_1$ is rotated by using the biasing force of the return spring in the counterclockwise direction, and the abutment pin 286Ab of the first front-curtain drive lever 286$A_1$ abuts on the second front-curtain drive lever 286$A_2$, and is stopped. The front curtains 283A runs in the closing direction by the rotational movement operation of the first front-curtain drive lever 286$A_1$, and thus, the exposure opening portion 281 can be fully closed by the front curtains 283A.

In a case where the second front-curtain drive lever 286$A_2$ and the second rear-curtain drive lever 286$B_2$ are held in the charge positions by the charging member 288, the front-curtain electromagnet 288A and the rear-curtain electromagnet 288B attract the magnetic piece 136A of the second front-curtain drive lever 286$A_2$ and the magnetic piece 136B of the second rear-curtain drive lever 286$B_2$ through electromagnetic force by being electrically conducted through the electromagnet drive units 295A and 295B, and the second front-curtain drive lever 286$A_2$ and the second rear-curtain drive lever 286$B_2$ are held in the charge positions.

In a case where the second front-curtain drive lever 286$A_2$ and the second rear-curtain drive lever 286$B_2$ are held in the charge positions by the front-curtain electromagnet 288A and the rear-curtain electromagnet 288B, the holding of the second front-curtain drive lever 286$A_2$ and the second rear-curtain drive lever 286$B_2$ in the charge positions using the charging member 288 is canceled, and thus, it is possible to perform curtain running preparation.

After the curtain running preparation is ended, in a case where the electrical conduction of the front-curtain electromagnet 288A by using the control signal from the FPS controller 296 is stopped (the front-curtain electromagnet 288A is demagnetized), the second front-curtain drive lever 286$A_2$ is rotated by using the biasing force of the front-curtain running spring 287A in the clockwise direction. In a case where the abutment pin 286Ab of the first front-curtain drive lever 286$A_1$ abuts on the second front-curtain drive lever 286$A_2$, the first front-curtain drive lever 286$A_1$ together with the second front-curtain drive lever 286$A_2$ is rotated in the clockwise direction, and causes the front curtains 283A to run in the opening direction.

After the curtain running preparation is ended, in a case where the electrical conduction of the rear-curtain electromagnet 288B is stopped (the rear-curtain electromagnet 288B is demagnetized), the second rear-curtain drive lever 286$B_2$ is rotated by using the biasing force of the rear-curtain running spring 287B in the clockwise direction, the first rear-curtain drive lever 286$B_1$ of which the abutment pin 286Bb abuts on the second rear-curtain drive lever 286$B_2$ is also simultaneously rotated in the clockwise direction, and causes the rear curtains 283B to run in the closing direction.

The main body CPU 220 outputs a shutter speed signal indicating a shutter speed at the time of imaging the still image and a signal (an S2-on signal generated by fully pushing the shutter release switch) indicating an operation of the shutter release switch 22 to the FPS controller 296.

The determination unit 297 is a portion that determines whether or not an exposure time (shutter speed) is equal to or greater than a time required for the curtain running preparation, and outputs the determination result to the FPS controller 296.

The switch unit 298 is a portion that automatically or manually switches between a first mode and a second mode, and outputs a switch signal indicating the first mode or the second mode to the FPS controller 296. In this example, the first mode is a mode (for example, a mode suitable for long exposure) in which the focal-plane shutter 280 is operated by the present invention, and the second mode is a mode in which the focal-plane shutter 280 is normally operated. For example, a user may operate the switch unit 298 depending on whether or not to perform imaging in long exposure, and may select the first mode or the second mode. In a case where the shutter speed is determined at the time of automatic exposure control or through manual operation, the switch unit 298 may automatically select the first mode or the second mode depending on the determined shutter speed.

The FPS controller 296 is a portion that outputs control signals to the drive units of the FPS drive unit based on the signals input from the main body CPU 220, the determination unit 297, and the switch unit 298 and controls the focal-plane shutter 280, and the detailed operation will be described below.

[Control Method of Focal-Plane Shutter]

Hereinafter, a control method of the focal-plane shutter 280 having the aforementioned configuration will be described.

<Normal Imaging>

Figure 7:
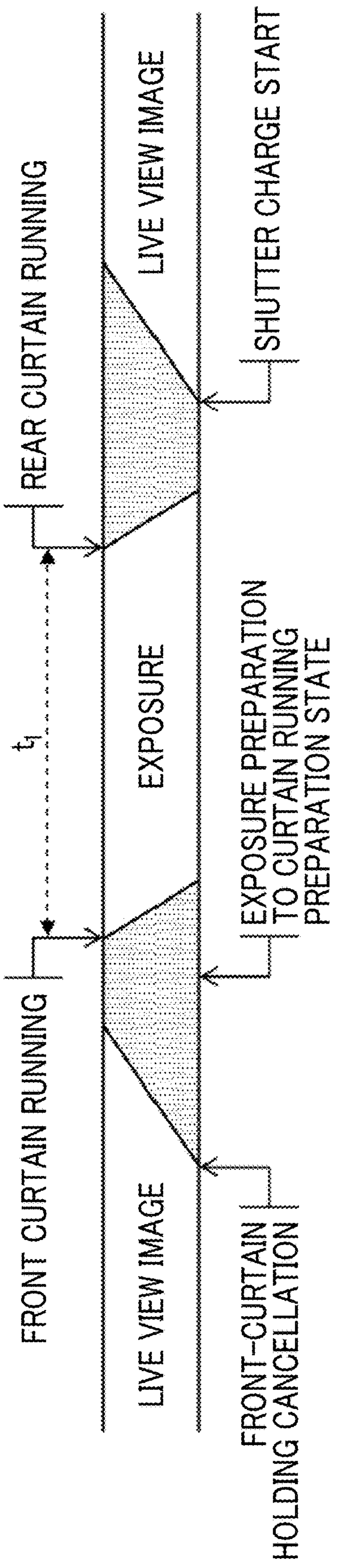
FIG. 7 is a timing chart showing operation timings of units of the focal-plane shutter in a case where normal imaging is performed by using the focal-plane shutter in a normally open state.

FIG. 7 is a timing chart showing operation timings of the units of the focal-plane shutter 280 in a case where normal imaging is performed by using the focal-plane shutter 280 in the normally open state.

[Normally Open Control]

In a case where the power lever 25 is operated and the digital camera 10 is powered on, the main body CPU 220 outputs a normally open control signal to the FPS controller 296 such that the focal-plane shutter 280 is in the normally open state. In a case where the normally open control signal is input from the main body CPU 220, the FPS controller 296 rotates the charging member 288 in the counterclockwise direction, and moves the second front-curtain drive lever $286A_2$ and the second rear-curtain drive lever $286B_2$ to the charge positions.

FIG. 5 shows states (initial states) of the units of the focal-plane shutter 280 before the digital camera 10 is powered on. In a case where the charging member 288 is rotated in the counterclockwise direction from the initial state, the second front-curtain drive lever $286A_2$ and the second rear-curtain drive lever $286B_2$ may be rotated in the counterclockwise direction as shown in FIG. 8, and may be moved to the charge positions.

Figure 8:
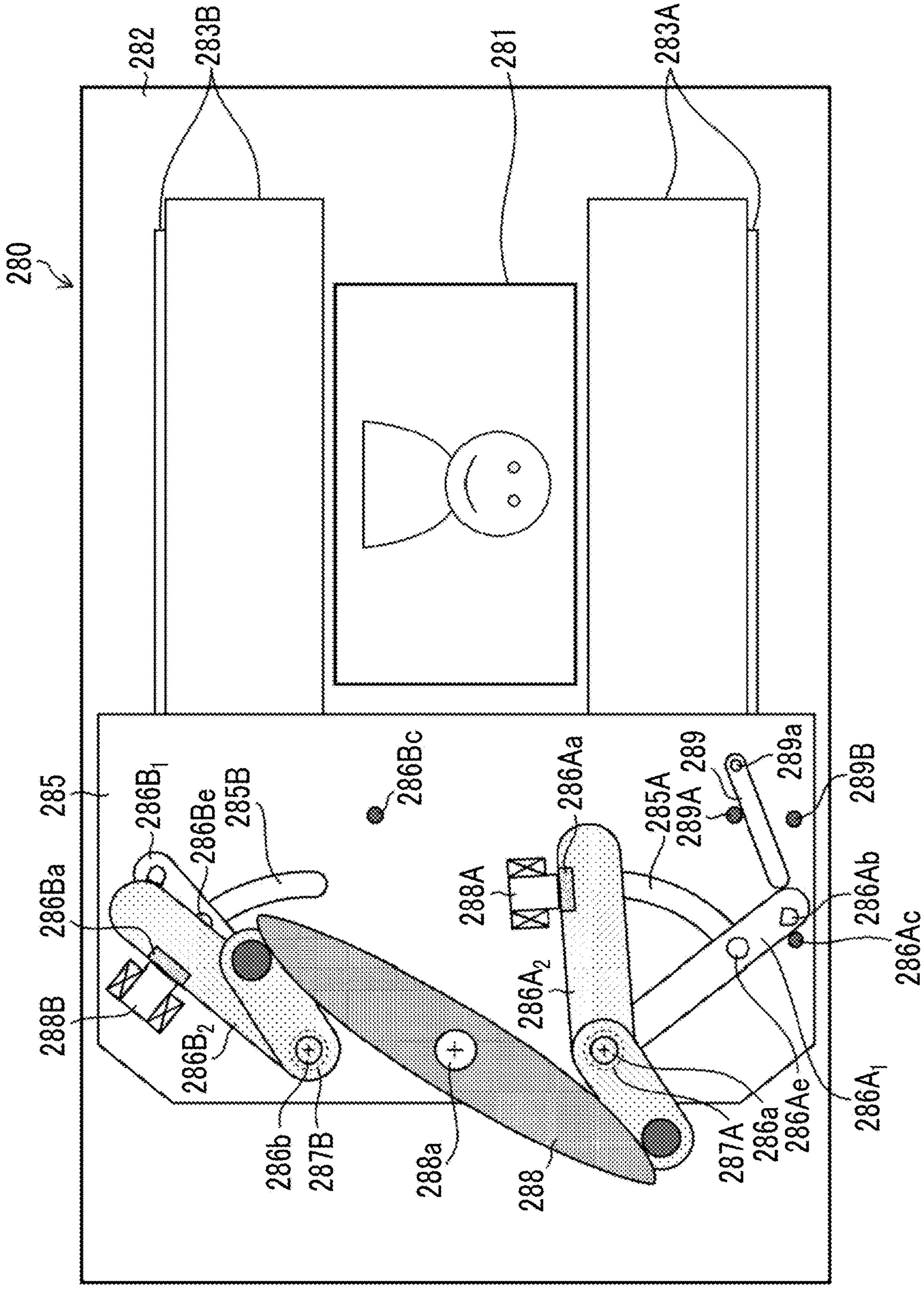
FIG. 8 is a front view of the focal-plane shutter showing operation states of the units of the focal-plane shutter in the normally open state.

FIG. 8 shows a normally open state in which the second front-curtain drive lever $286A_2$ and the second rear-curtain drive lever $286B_2$ are moved to the charge positions. In the initial state shown in FIG. 5, since the front-curtain lock lever 289 is positioned in the locked position, the rotational movement of the first front-curtain drive lever $286A_1$ in the counterclockwise direction is inhibited by the front-curtain lock lever 289 even though the second front-curtain drive lever $286A_2$ is rotated in the counterclockwise direction. As a result, the front-curtain drive arm $284A_1$ to which the drive pin 286Ae provided on the first front-curtain drive lever $286A_1$ is connected through the long hole 285A is held in the state of FIG. 4, and the running of the front curtains 283A for fully closing the exposure opening portion 281 in the closing direction is inhibited.

Subsequently, the FPS controller 296 operates the lock mechanism 293 through the lock mechanism drive unit 292, and inhibits the rotational movement of the charging member 288 by the lock mechanism 293. Accordingly, the second front-curtain drive lever $286A_2$ and the second rear-curtain drive lever $286B_2$ moved to the charge positions are respectively held in the charge positions. It is preferable that the lock mechanism 293 that inhibits the rotational movement of the charging member 288 mechanically locks during a lock period and does not require a drive force (power) from the lock mechanism drive unit 292.

As stated above, through the normally open control, the exposure opening portion 281 is held in the opened state and the focal-plane shutter 280 is in the normally open state in the charge state as shown in FIG. 8. In a case where the focal-plane shutter 280 is in the normally open state, the main body CPU 220 performs control for imaging the live view image by the imaging element 201 and control for displaying the captured live view image on the monitor 216.

[Front-Curtain Holding Cancelation]

In a case where composition is determined through the live view image and the shutter release switch 22 is half pushed, the main body CPU 220 performs the imaging preparation such as the AF processing and the AE processing. Subsequently, in a case where the shutter release switch 22 is fully pushed, the main body CPU 220 performs exposure control for imaging the still image through the imaging element controller 202 and the FPS controller 296.

The FPS controller 296 moves the front-curtain lock lever 289 positioned in the locked position to the unlocked position, and cancels the inhibition of the rotational movement of the first front-curtain drive lever $286A_1$ in the counterclockwise direction using the front-curtain lock lever 289 (front-curtain holding cancelation of FIG. 7).

In a case where the front-curtain holding cancelation is performed, the first front-curtain drive lever $286A_1$ is rotated by using the biasing force of the return spring in the counterclockwise direction. As a result, the front-curtain drive arm $284A_1$ to which the drive pin 286Ae provided on the first front-curtain drive lever $286A_1$ is connected through the long hole 285A is rotated in the counterclockwise direction. Thus, the front curtains 283A run in the closing direction, and fully closes the exposure opening portion 281.

Figure 9:
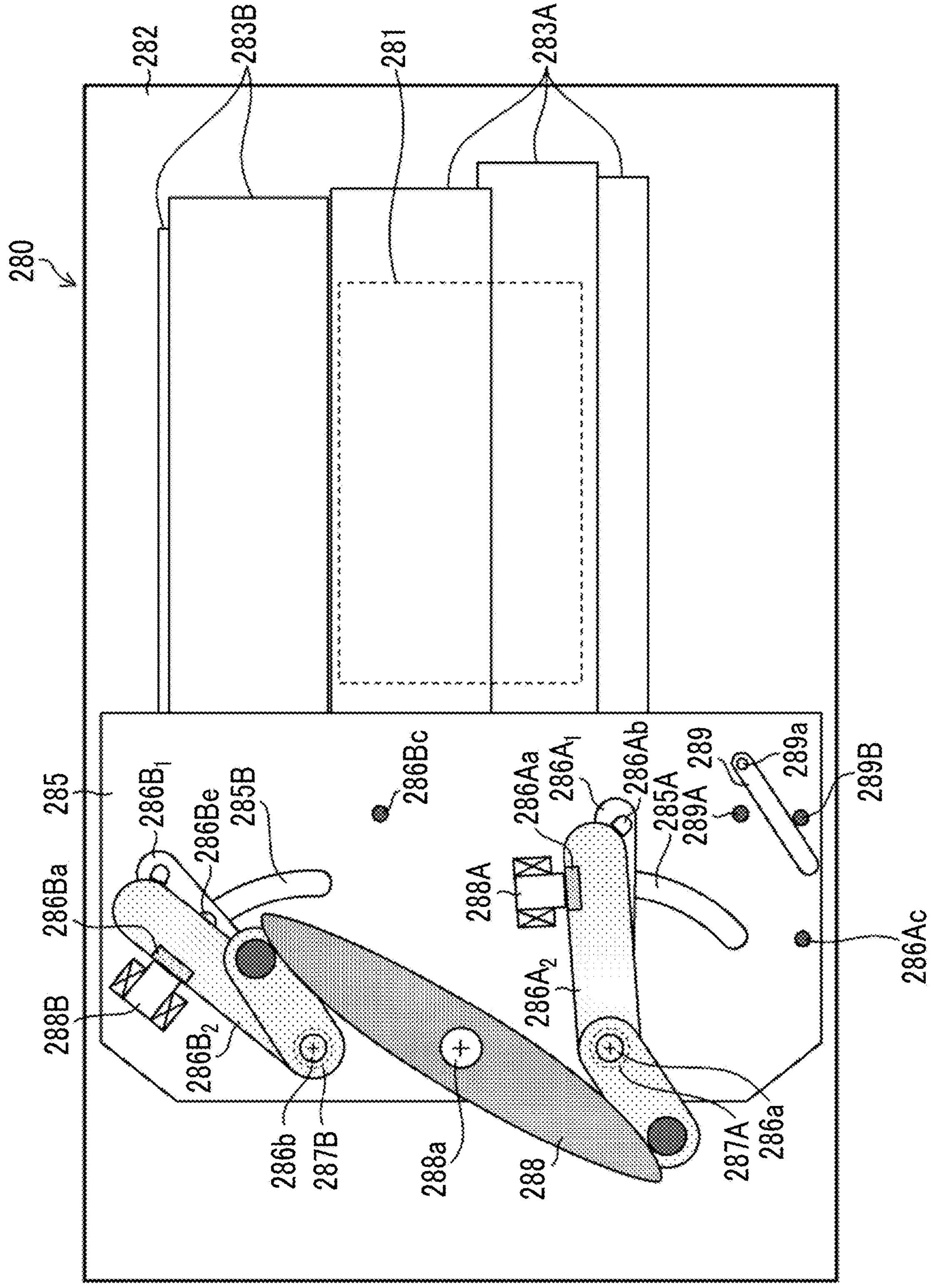
FIG. 9 is a front view of the focal-plane shutter showing a state in which front curtains run in a closing direction through front-curtain holding cancelation and an exposure opening portion is fully closed by front curtains.

FIG. 9 shows a state in which the front curtains 283A run in the closing direction through the front-curtain holding cancelation and the exposure opening portion 281 is fully closed by the front curtains 283A.

[Curtain Running Preparation]

Subsequently, the FPS controller 296 performs exposure preparation (curtain running preparation) of the focal-plane shutter 280 (FIG. 7).

Figure 10:
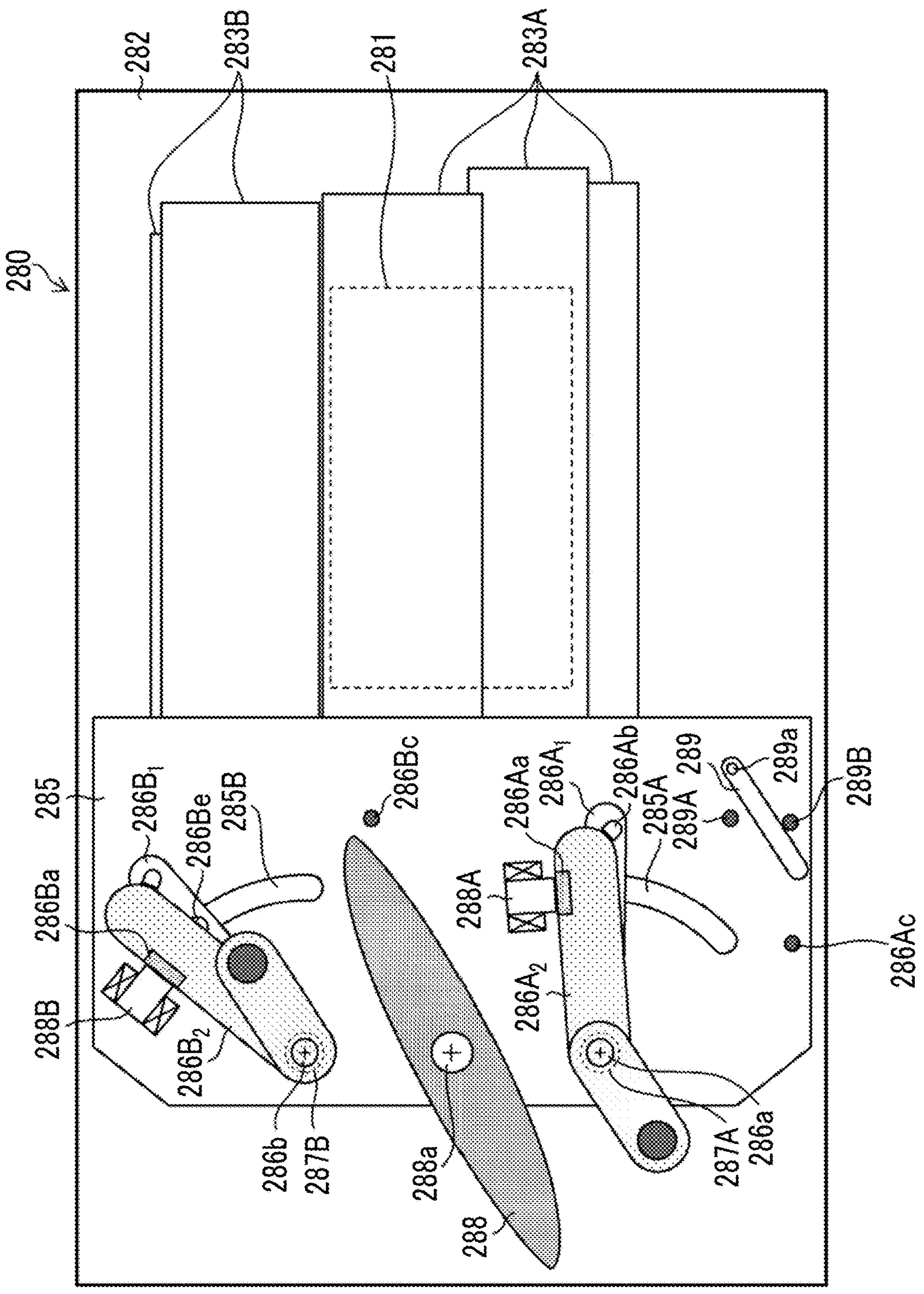
FIG. 10 is a front view of the focal-plane shutter showing a state in which curtain running preparation of the focal-plane shutter is ended.

FIG. 10 shows a state in which the curtain running preparation of the focal-plane shutter 280 is ended.

In this example, the curtain running preparation means that the front-curtain electromagnet 288A and the rear-curtain electromagnet 288B are magnetized (start the electrical conduction), the magnetic piece 136A of the second front-curtain drive lever $286A_2$ and the magnetic piece 136B of the second rear-curtain drive lever $286B_2$ are attracted by the front-curtain electromagnet 288A and the rear-curtain electromagnet 288B through the electromagnetic force, the second front-curtain drive lever $286A_2$ and the second rear-curtain drive lever $286B_2$ are held in the charge positions, the charging member 288 is rotated in the clockwise direction by canceling the locking using the lock mechanism 293, and the second front-curtain drive lever $286A_2$ and the second rear-curtain drive lever $286B_2$ retreat. In a case where the curtain running preparation is ended, the second front-curtain drive lever $286A_2$ or the second rear-curtain drive lever $286B_2$ may be rotated by using the biasing force of the front-curtain running spring 287A or the rear-curtain running spring 287B in the clockwise direction in a timing when the front-curtain electromagnet 288A or the rear-curtain electromagnet 288B are demagnetized.

[Front Curtain Running]

In a case where the curtain running preparation is ended, the FPS controller 296 demagnetizes the front-curtain electromagnet 288A, and rotates the second front-curtain drive lever $286A_2$ by using the biasing force of the front-curtain running spring 287A in the clockwise direction. The first front-curtain drive lever $286A_1$ of which the abutment pin 286Ab abuts on the second front-curtain drive lever $286A_2$ together with the second front-curtain drive lever $286A_2$ is rotated in the clockwise direction, causes the front curtains 283A to run in the opening direction (front curtain running), and opens the exposure opening portion 281.

Accordingly, exposure at the time of imaging the still image is started. Of course, electric charges accumulated in the imaging element 201 are discharged before the exposure is started.

Figure 11:
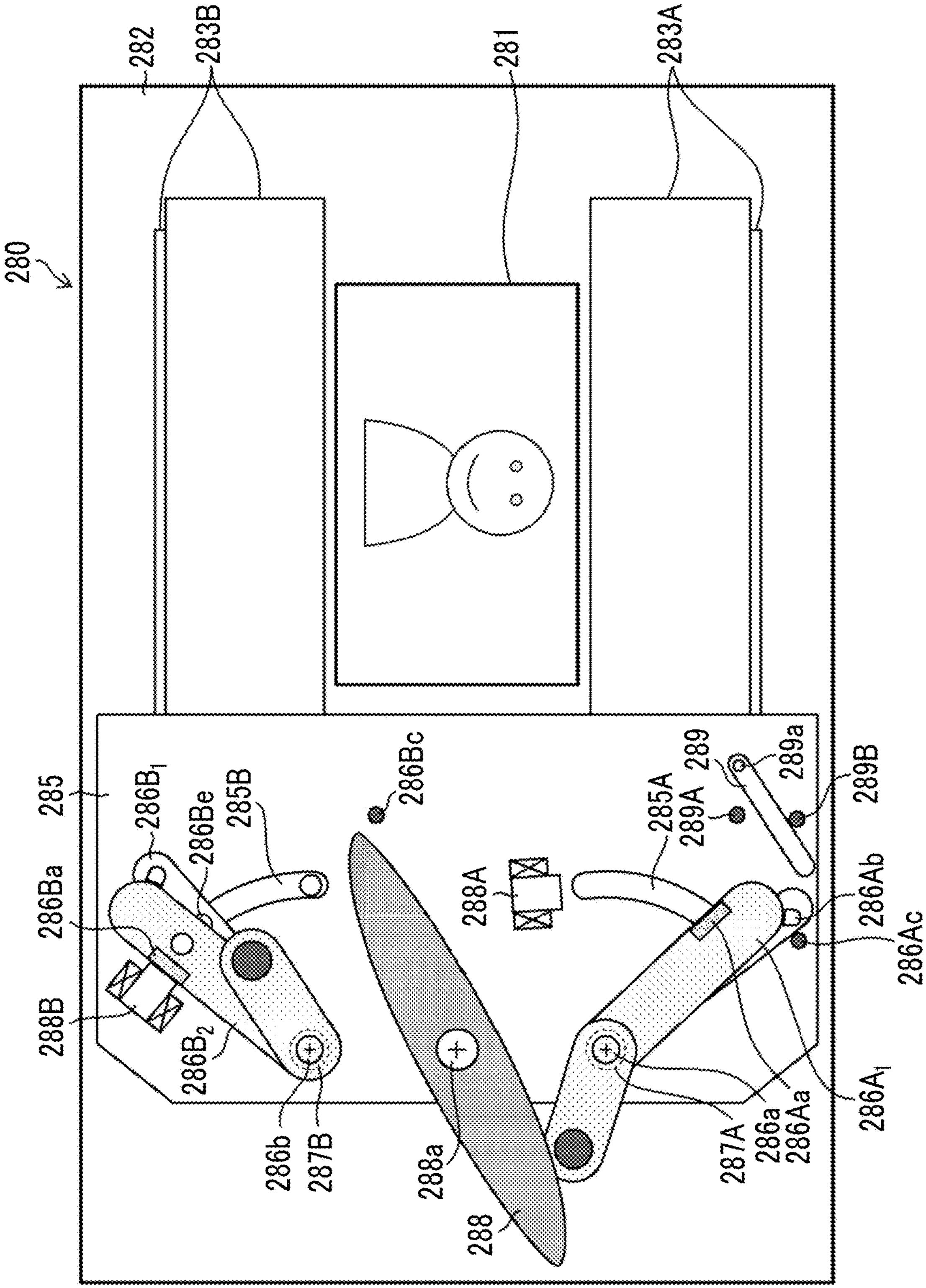
FIG. 11 is a front view of the focal-plane shutter showing a state in which the running of the front curtains in an opening direction is ended and the exposure opening portion is fully opened.

FIG. 11 shows a state in which the running of the front curtains 283A in the opening direction is ended and the exposure opening portion 281 is fully opened.

[Rear Curtain Running]

After a predetermined exposure time (a shutter speed instructed from the main body CPU 220) $t_1$ elapses from when the running of the front curtains 283A in the opening direction is started through the demagnetization of the front-curtain electromagnet 288A, the FPS controller 296 demagnetizes the rear-curtain electromagnet 288B, and rotates the second rear-curtain drive lever $286B_2$ by using the biasing force of the rear-curtain running spring 287B in the clockwise direction. The first rear-curtain drive lever $286B_1$ of which the abutment pin 286Bb abuts on the second rear-curtain drive lever $286B_2$ together with the second rear-curtain drive lever $286B_2$ is rotated in the clockwise direction, the rear curtains 283B runs in the closing direction (rear curtain running), and closes the exposure opening portion 281. Accordingly, the exposure at the time of imaging the still image is ended.

Figure 12:
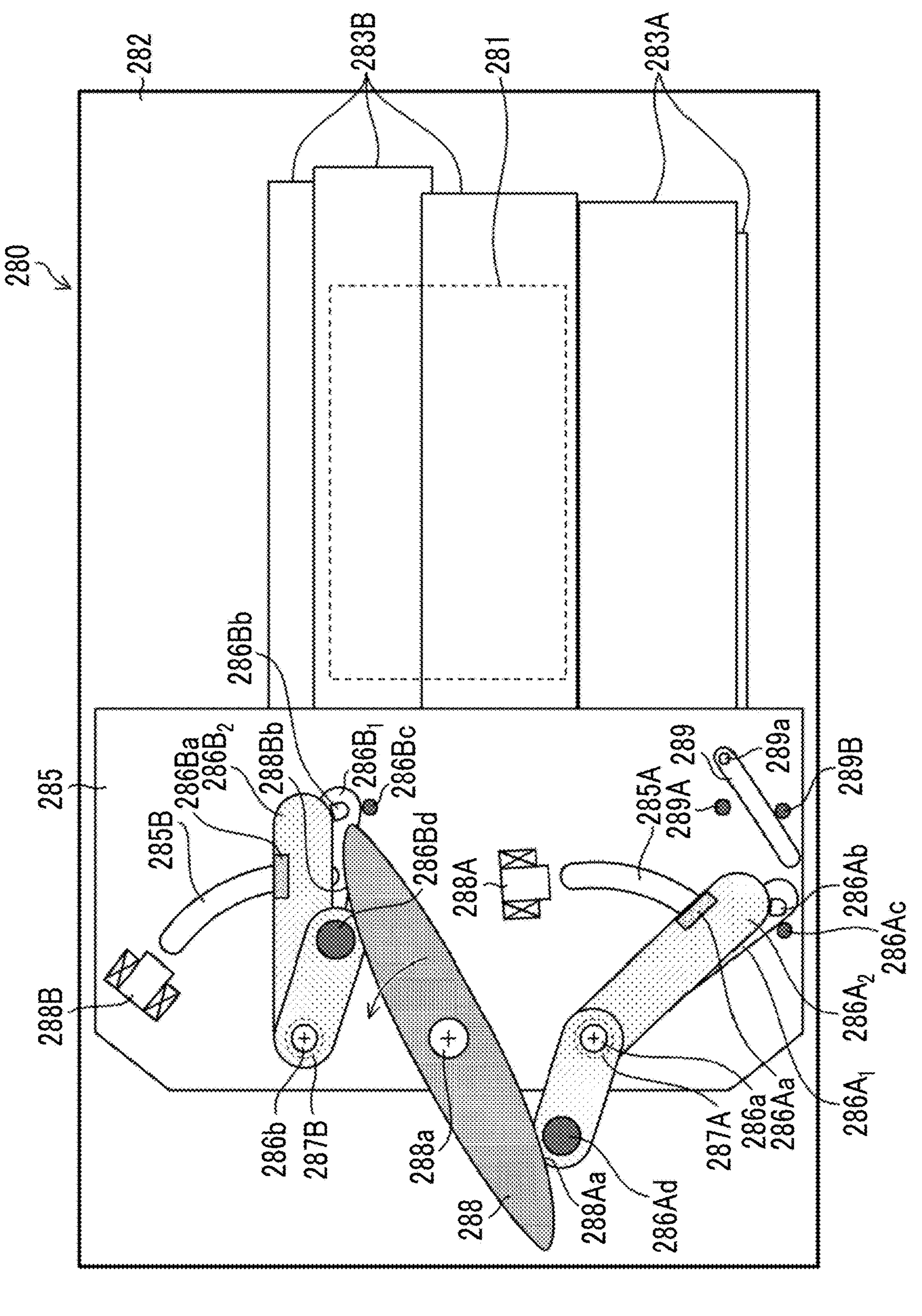
FIG. 12 is a front view of the focal-plane shutter showing a state in which the running of rear curtains in a closing direction is ended and the exposure opening portion is fully closed.

FIG. 12 shows a state in which the running of the rear curtains 283B in the closing direction is ended and the exposure opening portion 281 is fully closed.

In FIG. 7, for a period during which the running of the rear curtains 283B in the closing direction is ended and the exposure opening portion 281 is fully closed, the main body CPU 220 reads out signals (image signals) corresponding to the electric charges accumulated in the imaging element 201 by the imaging element controller 202.

After the image signals indicating the still image are read out, the focal-plane shutter 280 is set in the normally open state in order to prepare to image the next still image.

Figure 13:
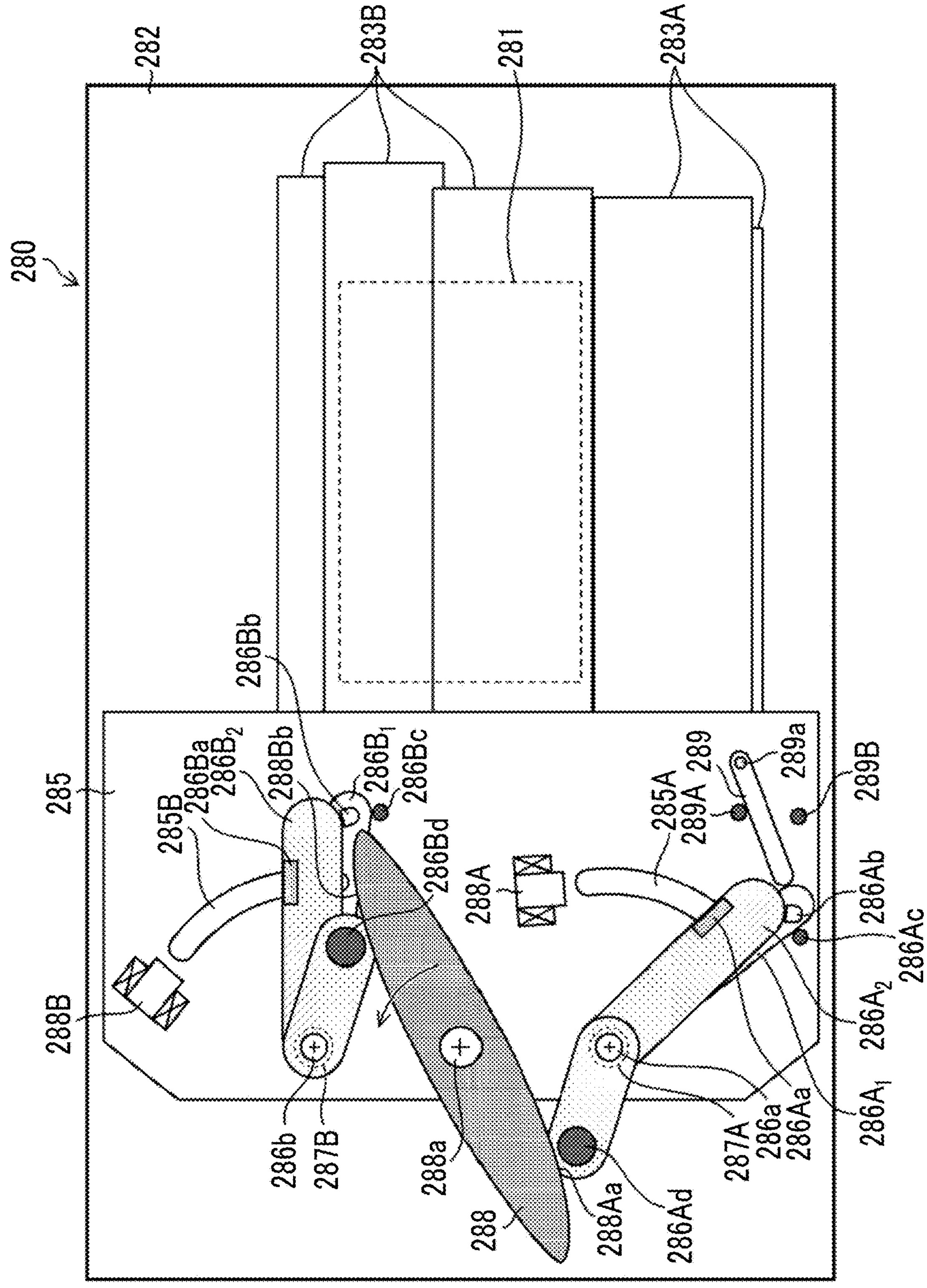
FIG. 13 is a front view of the focal-plane shutter showing a state in which a front-curtain lock lever is moved to a locked position from the state shown in FIG. 12.
Figure 14:
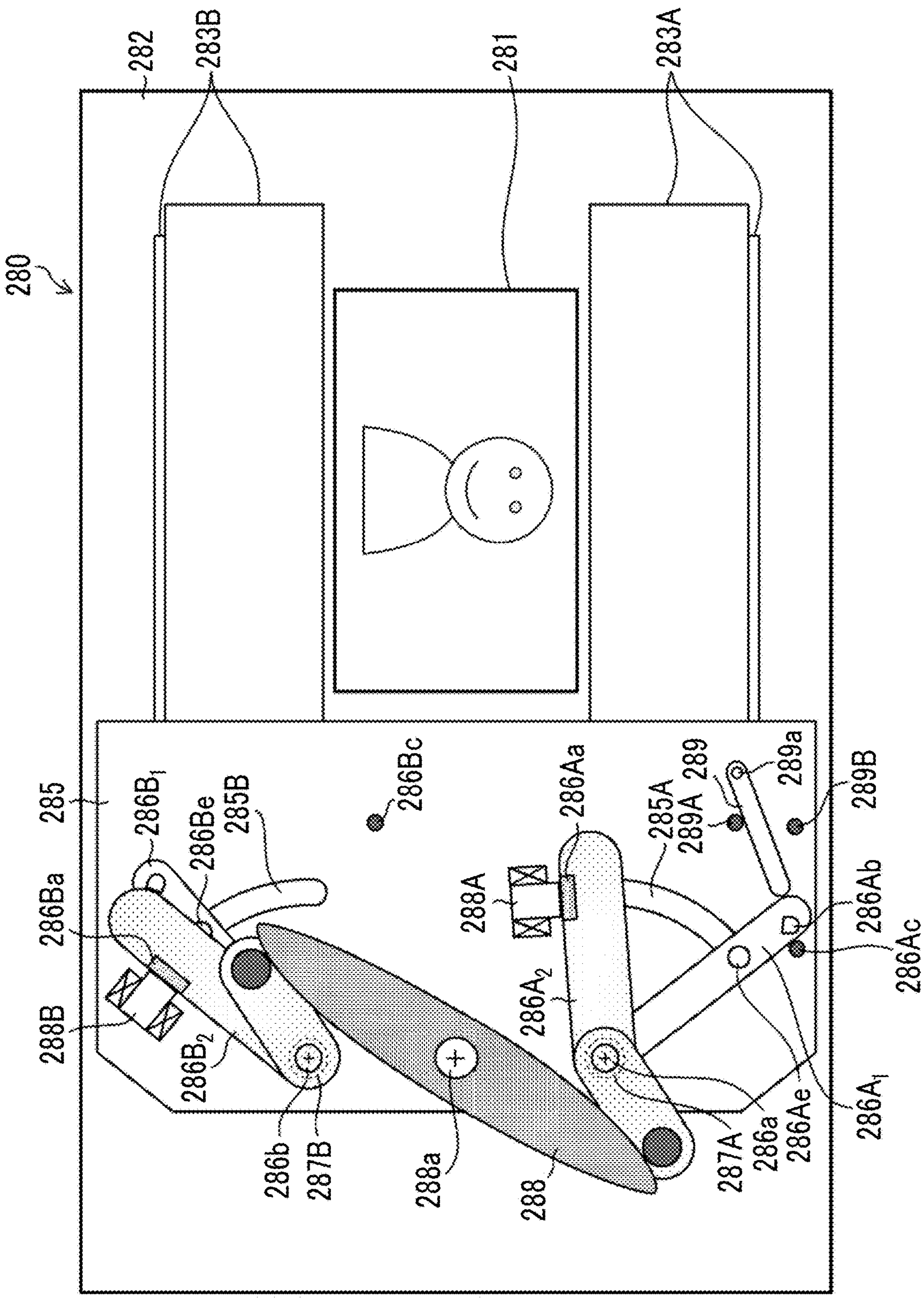
FIG. 14 is a front view of the focal-plane shutter in a case where the focal-plane shutter is changed to the normally open state from the state shown in FIG. 13.

That is, the FPS controller 296 moves the front-curtain lock lever 289 positioned in the unlocked position to the locked position (FIG. 13). Subsequently, the FPS controller rotates the charging member 288 in the counterclockwise direction, and moves the second front-curtain drive lever 286$A_2$ and the second rear-curtain drive lever 286$B_2$ to the charge positions (FIG. 14). The FPS controller 296 operates the lock mechanism 293, and inhibits the rotational movement of the charging member 288.

As stated above, in a case where the focal-plane shutter 280 is in the normally open state, the processing such as the imaging or displaying of the live view image is resumed.

<Imaging According to Present Invention>

First Embodiment

Figure 15:
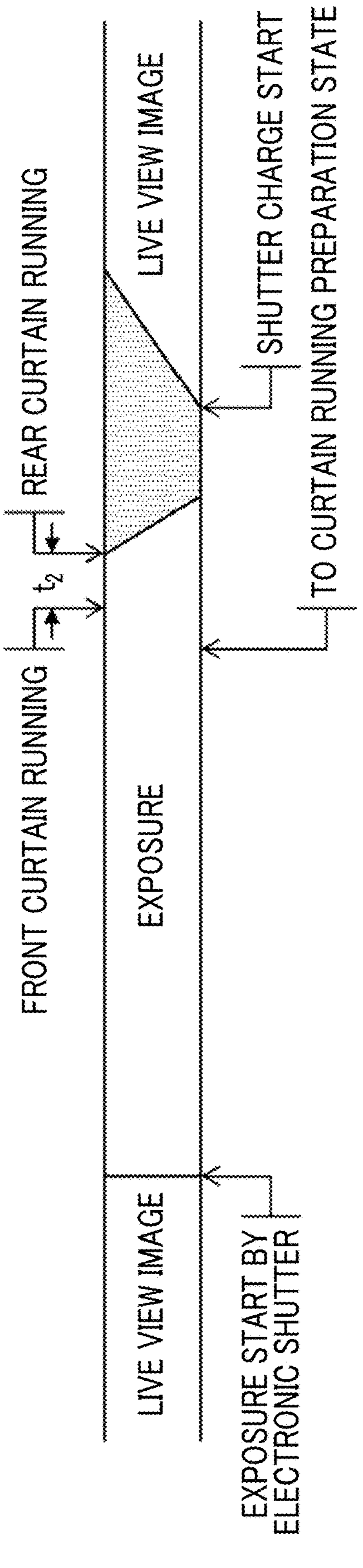
FIG. 15 is a timing chart of operation timings of the units of the focal-plane shutter in a case where imaging according to a first embodiment of the present invention is performed by using the focal-plane shutter in the normally open state.

FIG. 15 is a timing chart showing operation timings of the units of the focal-plane shutter 280 in a case where the imaging according to the first embodiment of the present invention is performed by using the focal-plane shutter 280 in the normally open state. Since control for setting the focal-plane shutter 280 in the normally open state and the normally open and control for imaging and displaying the live view image at the time of the normally open state are the same as that at the time of normal imaging, the detailed description thereof will be omitted. The imaging according to the present invention corresponds to imaging in the first mode, and the normal imaging corresponds to imaging in the second mode.

In the imaging according to the present invention shown in FIG. 15, a method of starting exposure at the time of imaging the still image and a timing of the curtain running preparation are different from those in normal imaging described with reference to FIG. 7.

[Exposure Starting Using Electronic Shutter]

In a case where the displaying of the live view image is performed in a state in which the focal-plane shutter 280 is in the normally open state, the composition is determined through the live view image. In a case where the shutter release switch 22 is half pushed, the main body CPU 220 performs the imaging preparation such as the AF processing and the AE processing. Subsequently, in a case where the shutter release switch 22 is fully pushed, the main body CPU 220 performs exposure control for imaging the still image through the imaging element controller 202 and the FPS controller 296.

In this case, the starting of the exposure at the time of imaging the still image is performed by the electronic shutter. That is, in a case where the shutter release switch 22 is fully pushed, the main body CPU 220 outputs an electronic shutter control signal to the imaging element controller 202, and simultaneously discharges the electric charges accumulated in each pixel of the imaging element 201 by the imaging element controller 202. Through the electronic shutter control, after the electric charges are discharged, the electric charges corresponding to the amount of newly incident light simultaneously with the starting of the exposure using the mechanical shutter are accumulated in each pixel of the imaging element 201, and the exposure at the time of imaging the still image is started.

[Curtain Running Preparation]

The curtain running preparation at the time of imaging according to the present invention is performed similarly to the normal imaging but is performed in a timing of the curtain running preparation different from that in the curtain running preparation at the time of the normal imaging.

The curtain running preparation at the time of imaging according to the present invention is performed immediately before the exposure corresponding to the shutter speed is completed after the exposure at the time of imaging the still image using the electronic shutter is started.

That is, immediately before the exposure at the time of imaging the still image is completed, the FPS controller 296 magnetizes the front-curtain electromagnet 288A and the rear-curtain electromagnet 288B, holds the second front-curtain drive lever 286$A_2$ and the second rear-curtain drive lever 286$B_2$ in the charge positions through the electromagnet force. Subsequently, the FPS controller rotates the charging member 288 in the clockwise direction by canceling the locking using the lock mechanism 293, and retreats the charging member from the second front-curtain drive lever 286$A_2$ and the second rear-curtain drive lever 286$B_2$.

In this example, it is preferable that "immediately before the exposure is completed at the time of imaging the still image" is a point of time close to a point of time when the rear curtain running is started, but needs to be a point of time earlier than the point of time when the running of the rear curtains is started by a time required for the curtain running preparation. This is because the rear curtains 283B are not able to run before the curtain running preparation is ended.

[Front Curtain Running]

In a case where the curtain running preparation is ended, the FPS controller 296 demagnetizes the front-curtain electromagnet 288A, and rotates the second front-curtain drive lever 286$A_2$ by using the biasing force of the front-curtain running spring 287A in the clockwise direction. However, at the time of the imaging according to the present invention, since the front-curtain lock lever 289 is positioned in the locked position and the rotational movement of the first front-curtain drive lever 286$A_1$ is inhibited (since the front curtains 283A are held in the opened state), the front curtains 283A do not run in the opening direction.

[Rear Curtain Running]

After a predetermined exposure time (the shutter speed instructed from the main body CPU 220) elapses from when the exposure of the still image is started through the electronic shutter control, the FPS controller 296 demagnetizes the rear-curtain electromagnet 288B, and rotates the second rear-curtain drive lever 286$B_2$ by using the biasing force of the rear-curtain running spring 287B in the clockwise direction. The first rear-curtain drive lever 286$B_1$ of which the abutment pin 286Bb abuts on the second rear-curtain drive lever 286$B_2$ together with the second rear-curtain drive lever 286$B_2$ is rotated in the clockwise direction, causes the rear curtains 283B to run in the closing direction, and closes the exposure opening portion 281. Accordingly, the exposure at the time of imaging the still image is ended.

In this example, a time $t_2$ shown in FIG. 15 is in common with the time (exposure time) $t_1$ at the time of the normal imaging shown in FIG. 7 in that the time $t_2$ corresponds a time during which the rear-curtain electromagnet 288B is magnetized in order to hold the rear curtains 283B after the front curtains 283A run. However, the time $t_2$ shown in FIG. 15 is a time irrelevant to the exposure time, and is a time as short as the time required for the curtain running preparation.

Therefore, at the time of imaging the still image according to the present invention, it is possible to shorten the time (in the present example, time $t_2$) during which the rear-curtain electromagnet 288B is magnetized in order to hold the rear curtains 283B after the front curtains 283A run even in the case of long exposure in which the exposure time is equal to or greater than a predetermined time (for example, one second), and it is possible to greatly reduce power consumption as compared to a case where the normal imaging is performed in the long exposure.

It is possible to reduce heat generation caused by a reduction in magnetization power by shortening the magnetization time, and it is possible to restrain an increase of noise (deterioration in image quality) caused by the heat generation.

Second Embodiment

Figure 16:
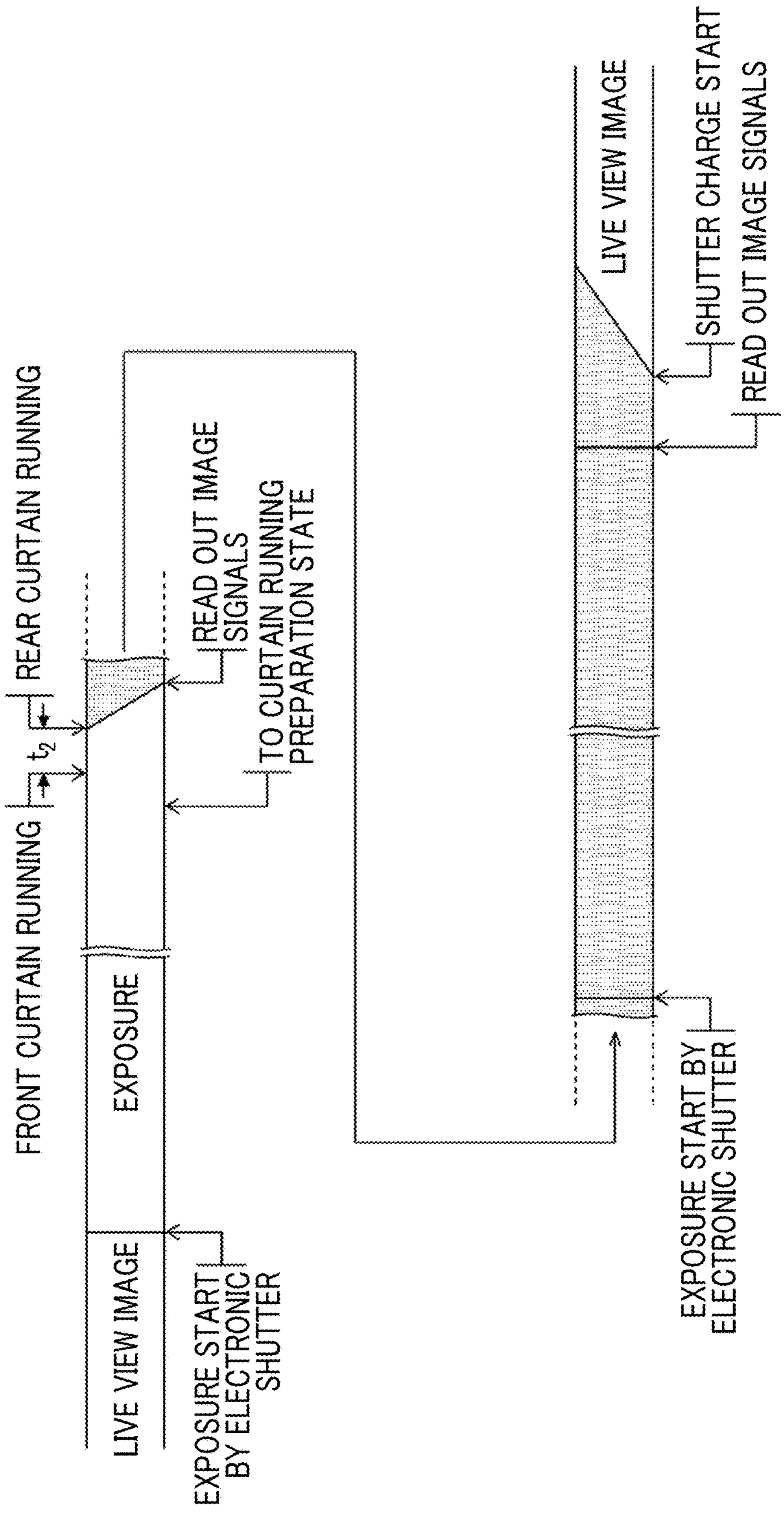
FIG. 16 is a timing chart showing operation timings of the units of the focal-plane shutter in a case where imaging according to a second embodiment of the present invention is performed by using the focal-plane shutter in the normally open state.

FIG. 16 is a timing chart showing operation timings of the units of the focal-plane shutter 280 in a case where imaging according to a second embodiment of the present invention is performed by using the focal-plane shutter 280 in the normally open state, and particularly shows a case where noise canceling control for long exposure is performed. In the second embodiment of the present invention shown in FIG. 16, the description of the operations in common with those in the first embodiment shown in FIG. 15 will be omitted.

The second embodiment of the present invention is different from the first embodiment in that an exposure time at the time of imaging the still image is longer than the exposure time according to the first embodiment and the noise canceling control for long exposure is performed.

In FIG. 16, in a case where the long exposure (rear curtain running) is ended, the imaging element controller 202 reads the image signals from the imaging element 201 for a period during which the exposure opening portion 281 is fully closed according to a command of the main body CPU 220. In a case where the reading-out of the image signals is ended, the imaging element controller 202 starts the exposure through the electronic shutter control according to a command of the main body CPU 220. The starting of the exposure through the electronic shutter control in this case means that the electric charges accumulated in each pixel of the imaging element 201 are discharged. Since the exposure opening portion 281 is fully closed by the rear curtains 283B, subject light is not actually incident (exposed) on the imaging element 201 after the exposure is started.

The imaging element controller 202 reads out the image signals according to a command of the main body CPU 220 after the same time as the exposure time of the long exposure elapses after the exposure through the electronic shutter control is started. The image signals correspond to dark current noise signals (dark current noise signals increase in proportion to a time during which the electric charges are accumulated) generated in the imaging element 201.

The digital signal processing unit 206 removes noise for long exposure by subtracting the dark current noise signals obtained in this manner from the image signals including the dark current noise signals captured through long exposure.

Third Embodiment

Figure 17:
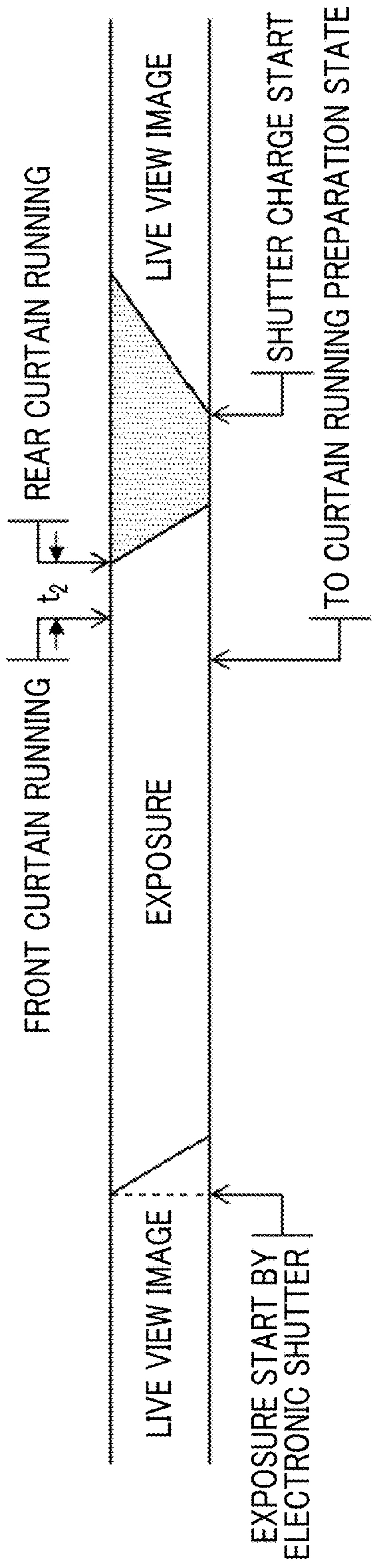
FIG. 17 is a timing chart showing operation timings of the units of the focal-plane shutter in a case where imaging according to a third embodiment of the present invention is performed by using the focal-plane shutter in the normally open state.

FIG. 17 is a timing chart showing operation timings of the units of the focal-plane shutter 280 in a case where imaging according to a third embodiment of the present invention is performed by using the focal-plane shutter 280 in the normally open state.

In the third embodiment of the present invention shown in FIG. 17, the description of the operations in common with those in the first embodiment shown in FIG. 15 will be omitted.

In the third embodiment of the present invention, electronic shutter control at the time of starting exposure is different from that of the first embodiment, and other operations are similarly performed.

That is, in the electronic shutter control at the time of starting the exposure according to the first embodiment of the present invention, the electric charges accumulated in each pixel of the imaging element 201 are simultaneously discharged. However, in the electronic shutter control at the time of starting the exposure according to the third embodiment of the present invention, the electric charges accumulated in the imaging element 201 are discharged according to a reset sequence that simulates running characteristics of the rear curtains 283B in the closing direction.

In FIG. 17, running characteristics of the rear curtains 283B in the closing direction from when the rear curtain running is started to when the rear curtain running is ended are represented by a diagonal line, and a slope of the diagonal line corresponds to a running speed of the rear curtains 283B.

In the present example, at the time of the rear curtain running, the exposure opening portion 281 is gradually closed from an upper end of the exposure opening portion 281 toward a lower end thereof by the rear curtains 283B. Accordingly, in a case where the starting of the exposure using the electronic shutter for simultaneously discharging the electric charges accumulated in each pixel of the imaging element 201 is performed as in the first embodiment shown in FIG. 15, a difference in the exposure time is generated between the pixel on the upper end of the imaging element 201 and the pixel on the lower end thereof.

Since the difference in the exposure time is small, there is not a problem in the case of the long exposure. However, the difference in the exposure time causes a brightness unevenness in the case of the imaging with a short exposure time.

In the third embodiment of the present invention, the electric charges accumulated in the imaging element 201 are discharged by the reset sequence that simulates the running characteristics of the rear curtains 283B in the closing direction at the time of starting the exposure using the electronic shutter.

Specifically, at the time of discharging the electric charges accumulated in the imaging element 201 in a point of time of starting the exposure using the electronic shutter, the electric charges of the pixels for each line of the imaging element 201 are discharged (the accumulation of the electric charges is started by sequentially resetting lines of the pixels) by the imaging element controller 202 line by line with a sequential time difference (a time difference corresponding to the running characteristics of the rear curtains 283B in the closing direction).

Accordingly, the exposure time is set to be constant irrespective of the position of the captured image in the running direction of the rear curtains 283B, and the image quality is improved.

Fourth Embodiment

Figure 18:
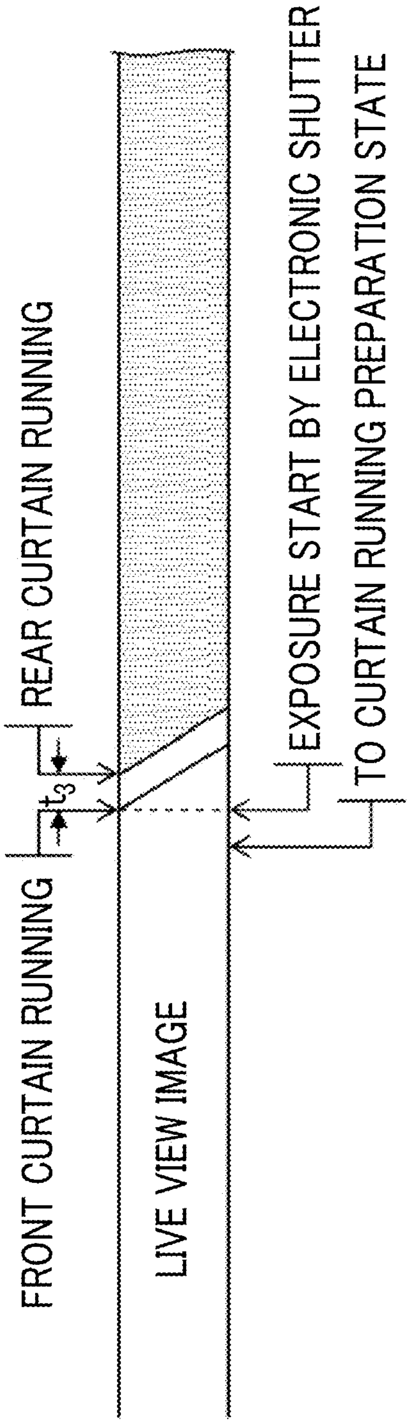
FIG. 18 is a timing chart showing operation timings of the units of the focal-plane shutter in a case where imaging according to a fourth embodiment of the present invention is performed by using the focal-plane shutter in the normally open state.

FIG. 18 is a timing chart showing operation timings of the units of the focal-plane shutter 280 in a case where imaging according to a fourth embodiment of the present invention is performed by using the focal-plane shutter 280 in the normally open state. In the fourth embodiment of the present invention shown in FIG. 18, the description of the operations in common with those in the first embodiment and the third embodiment shown in FIGS. 15 and 17 will be omitted.

The fourth embodiment of the present invention is applied to a case where the shutter speed is high (for example, a case where the exposure time is within a time required for the curtain running preparation).

In the first embodiment, in a case where the shutter release switch 22 is fully pushed, the exposure using the electronic shutter is immediately started without performing the curtain running preparation. Accordingly, there is an advantage that the imaging of the still image intended by a photographer can be performed with no time lag from a point of time when the shutter release switch 22 is operated to a point of time when the imaging of the still image is started.

Meanwhile, in a case where the shutter speed is higher than the time required for the curtain running preparation and the curtain running preparation is performed after the exposure using the electronic shutter is started, there is a problem that the curtain running preparation is not ended until the rear curtain running is started.

In the fourth embodiment, in a case where the shutter release switch 22 is fully pushed, the curtain running preparation is started before the exposure using the electronic shutter is started. It is preferable that a point of time when the curtain running preparation is started is a point of time closest to the point of time when the rear curtain running is started (that is, the point of time earlier than a point of time when the rear curtain running is started by the time required for the curtain running preparation) in a point of time when the curtain running preparation is ended until a point of time the rear curtain running is started in a case where the curtain running preparation is performed from the starting point of time.

As described above, the determination unit 297 determines whether or not the exposure time (shutter speed) is equal to or greater than the time required for the curtain running preparation, and outputs the determination result to the FPS controller 296 (FIG. 6).

In a case where the determination result indicating that the exposure time is less than the time required for the curtain running preparation is input from the determination unit 297 and the shutter release switch 22 is fully pushed, the FPS controller 296 starts the curtain running preparation, and subsequently starts the exposure using the electronic shutter (front curtain running). It is preferable that the electronic shutter control at the time of starting the exposure in this case is to discharge the electric charges accumulated in the imaging element 201 according to the reset sequence that simulates the running characteristics of the rear curtains 283B in the closing direction as in the third embodiment.

The FPS controller 296 causes the rear curtains to run after a short exposure time $t_3$ elapses from when the front curtains run. Accordingly, it is possible to perform imaging in short exposure even in a case where the starting of the exposure is performed through the electronic shutter control and the completion of the exposure is performed through the running of the rear curtains 283B.

Fifth Embodiment

Figure 19:
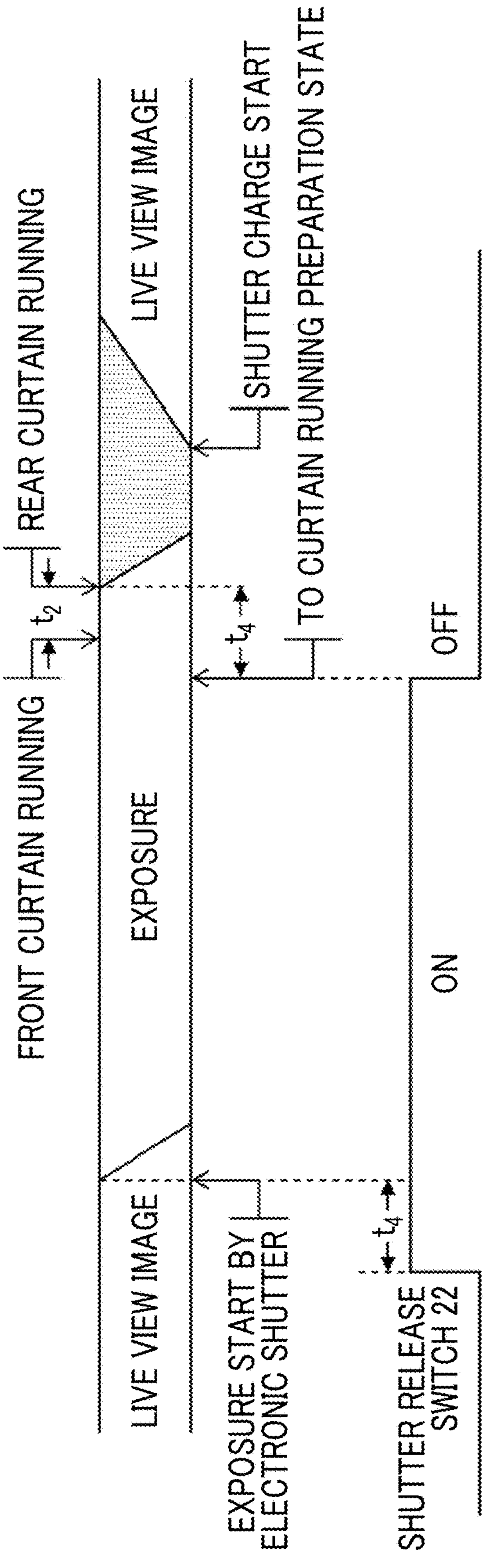
FIG. 19 is a timing chart showing operation timings of the units of the focal-plane shutter in a case where imaging according to a fifth embodiment of the present invention is performed by using the focal-plane shutter in the normally open state.

FIG. 19 is a timing chart showing operation timings of the units of the focal-plane shutter 280 in a case where imaging according to a fifth embodiment of the present invention is performed by using the focal-plane shutter 280 in the normally open state. In the fifth embodiment of the present invention shown in FIG. 19, the description of the operations in common with those in the first embodiment and the third embodiment shown in FIGS. 15 and 17 will be omitted.

The fifth embodiment of the present invention is applied to a case where bulb imaging is performed. The bulb imaging means a time during which the shutter release switch 22 is fully pushed (an output period of the S2-on signal), that is, long exposure in which the exposure is continued. For example, the bulb imaging may be set by rotating the shutter speed dial 23 to a bulb imaging position "B".

In the case of the bulb imaging, since the curtain running preparation operation is performed after the ending of the fully pushing of the shutter release switch 22 (changing from the S2-on signal to the S2-off signal) is detected, there is a problem that the exposure time becomes long by a time during which a curtain running preparation operation is performed.

The influence due to an increase in the exposure time is minor in a case where the exposure time through the bulb imaging is several seconds, but the influence due to the exposure time increases in a case where the exposure time through the bulb imaging is a short time.

In the fifth embodiment of the present invention, an exposure start timing through the electronic shutter control is delayed by the time during which the curtain running preparation operation is performed, and the starting of the rear curtain running is delayed by a time during which the exposure start timing is delayed by performing the curtain running preparation in a case where the ending of the fully pushing of the shutter release switch 22 is detected. Accordingly, the exposure is performed by the same time as the time during which the shutter release switch 22 is fully pushed.

That is, in a case where an exposure start command (S2-on signal) through the operation of the shutter release switch 22 is input as shown in FIG. 19, the FPS controller 296 starts the exposure through the electronic shutter control by delaying the exposure start timing from a rising point of time of the S2-on signal by at least a time $t_4$ required for the curtain running preparation.

In the present example, the time $t_4$ is a total time of the time required for the curtain running preparation and the time $t_2$ during which the rear-curtain electromagnet 288B is magnetized in order to hold the rear curtains 283B after the front curtains 283A run. As stated above, the time $t_2$ is a time irrelevant to the exposure time, and is a time as short as the time required for the curtain running preparation. However, the time $t_2$ may be set to be zero. Accordingly, the minimum time of the time $t_4$ is the time required for the curtain running preparation.

Thereafter, in a case where an exposure completion command (S2-on signal) through the operation of the shutter release switch 22 is input, the FPS controller 296 starts the curtain running preparation operation from a falling point of time of the S2-off signal, demagnetizes the front-curtain electromagnet 288A after the curtain running preparation operation is completed, rotates the second front-curtain drive lever 286$A_2$ by using the biasing force of the front-curtain running spring 287A in the clockwise direction, demagnetizes the rear-curtain electromagnet 288B after the time $t_2$ elapses from when the front-curtain electromagnet 288A is demagnetized (that is, after the time $t_4$ elapses from the falling point of time of the S2-off signal), and rotates the second rear-curtain drive lever 286$B_2$ by using the biasing force of the rear-curtain running spring 287B in the clockwise direction. Accordingly, the exposure opening portion 281 is closed by causing the rear curtains 283B to run in the closing direction, and the exposure at the time of imaging the still image is completed.

Sixth Embodiment

Figure 20:
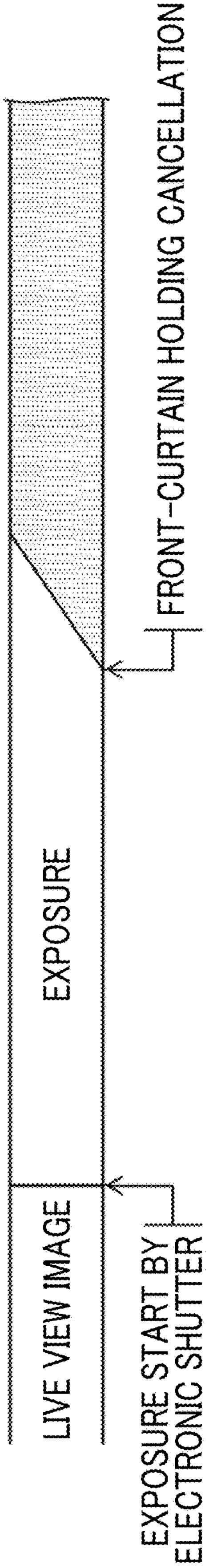
FIG. 20 is a timing chart showing operation timings of the units of the focal-plane shutter in a case where imaging according to a sixth embodiment of the present invention is performed by using the focal-plane shutter in the normally open state.

FIG. 20 is a timing chart showing operation timings of the units of the focal-plane shutter 280 in a case where imaging according to a sixth embodiment of the present invention is performed by using the focal-plane shutter 280 is in the normally open state. In the sixth embodiment of the present invention shown in FIG. 20, the description of the operations in common with those in the first embodiment shown in FIG. 15 will be omitted.

A completion operation of the exposure according to the sixth embodiment of the present invention is different from that of the first embodiment.

That is, the FPS controller 296 does not perform the completion of the exposure through the running of the rear curtains 283B, and performs the completion of the exposure through the running of the front curtains 283A in the closing direction.

In the case of the front curtains 283A of the focal-plane shutter 280 in the normally open state, the rotational movement of the first front-curtain drive lever 286$A_1$ in the counterclockwise direction (the running of the front curtains 283A in the closing direction) is inhibited by the front-curtain lock lever 289 positioned in the locked position as shown in FIG. 8.

In a case where the curtain running preparation is not completed at the time of ending the exposure after the exposure through the electronic shutter control is started, the FPS controller 296 cancels the inhibition of the rotational movement of the first front-curtain drive lever 286$A_1$ (the running of the front curtains 283A in the closing direction) in the counterclockwise direction using the front-curtain lock lever 289. The first front-curtain drive lever 286$A_1$ is biased by using the biasing force of the return spring in the counterclockwise direction. However, the first front-curtain drive lever is rotated by using the biasing force of the return spring in the counterclockwise direction by canceling the inhibition of the rotational movement of the first front-curtain drive lever 286$A_1$ in the counterclockwise direction (the running of the front curtains 283A in the closing direction).

Accordingly, it is possible to complete the exposure by causing the front curtains 283A to run in the closing direction (see FIG. 9), and it is possible to perform the imaging even in a situation in which the curtain running preparation is not completed (at the time of abnormal occurrence).

In the example shown in FIG. 20, the starting of the exposure using the electronic shutter is performed by simultaneously discharging the electric charges of all the pixels of the imaging element 201. However, it is preferable that the electric charges accumulated in the imaging element 201 are discharged according to the reset sequence that simulates the running characteristics of the front curtains 283A in the closing direction.

Seventh Embodiment

Figure 21:
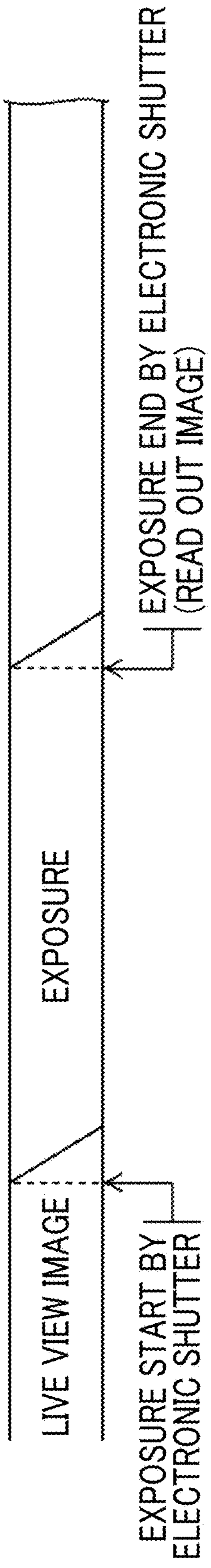
FIG. 21 is a timing chart showing operation timings of the units of the focal-plane shutter in a case where imaging according to a seventh embodiment of the present invention is performed by using the focal-plane shutter in the normally open state.

FIG. 21 is a timing chart showing operation timings of the units of the focal-plane shutter 280 in a case where imaging according to a seventh embodiment of the present invention is performed by using the focal-plane shutter 280 in the normally open state. In the seventh embodiment of the present invention shown in FIG. 21, the description of the operations in common with those in the third embodiment shown in FIG. 17 will be omitted.

A completion operation of the exposure according to a seventh embodiment of the present invention is different from that of the third embodiment.

That is, the FPS controller 296 does not complete the exposure through the running of the rear curtains 283B, and ends the exposure through the electronic shutter control.

In this example, the imaging element controller 202 reads out the electric signals (image signals) corresponding to the electric charges accumulated in each pixel of the imaging element 201 according to a command of the main body CPU 220, and thus, the ending of the exposure through the electronic shutter control is performed.

Accordingly, at the time of performing the completion operation of the exposure, it is possible to perform the imaging even in a situation in which the curtain running preparation is not completed in a case where the front curtains 283A are not able to run in the closing direction (at the time of abnormal occurrence).

[Control Method of Digital Camera]

Hereinafter, a control method of a digital camera according to the present invention will be described.

Figure 22:
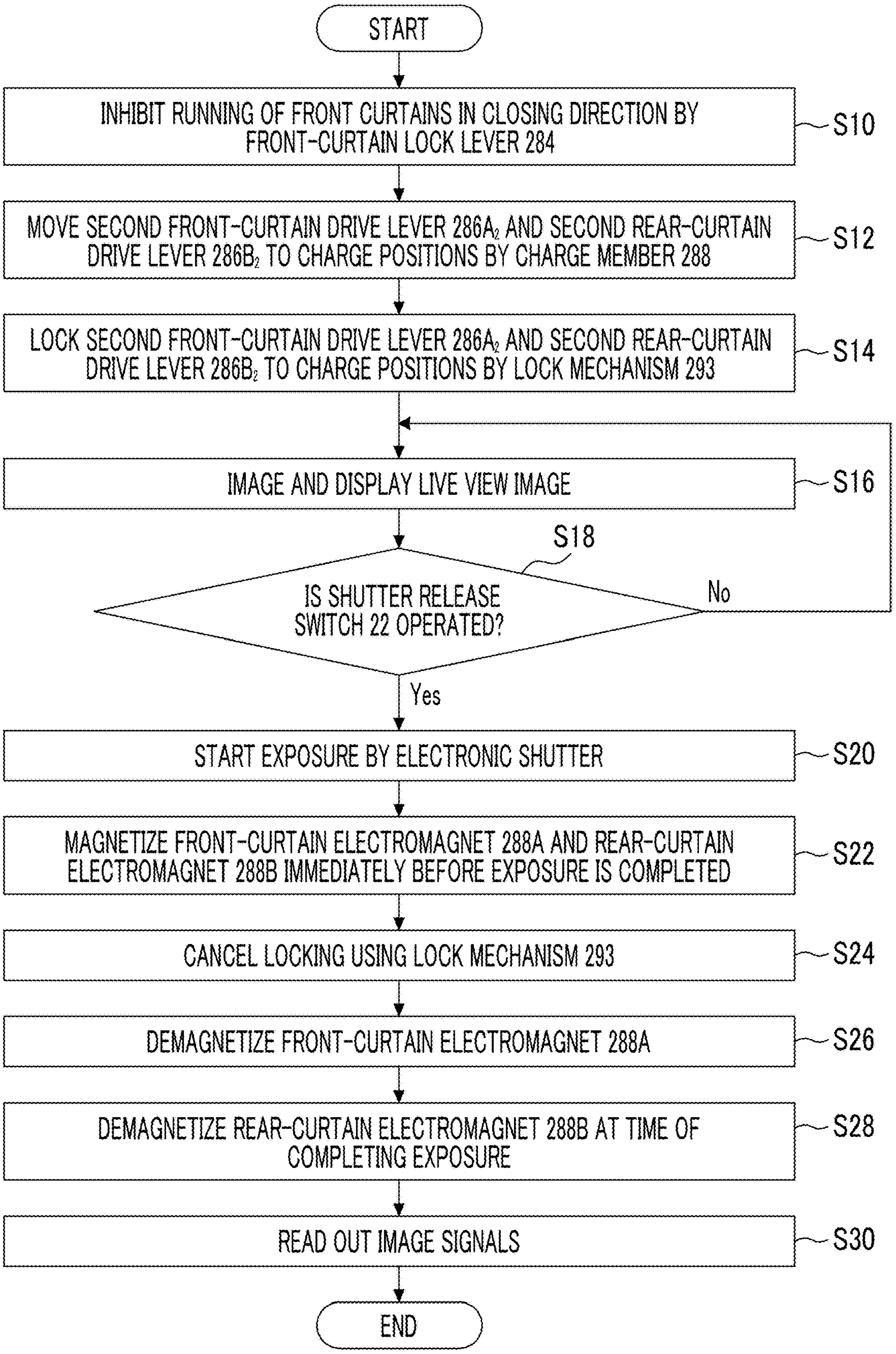
FIG. 22 is a flowchart showing an embodiment of a control method of a digital camera according to the present invention.

FIG. 22 is a flowchart showing an embodiment of a control method of a digital camera according to the present invention.

In FIG. 22, the FPS controller 296 causes the focal-plane shutter 280 to be operated in the normally open state by moving the front-curtain lock lever 289 to the locked position and inhibiting the running of the front curtains in the closing direction (step S10).

Subsequently, the FPS controller 296 rotates the charging member 288 in the counterclockwise direction, and moves the second front-curtain drive lever 286$A_2$ and the second rear-curtain drive lever 286$B_2$ to the charge positions (step S12).

Subsequently, the FPS controller 296 operates the lock mechanism 293, and mechanically locks the second front-curtain drive lever 286$A_2$ and the second rear-curtain drive lever 286$B_2$ moved to the charge positions in the charge positions (step S14).

Through the control in steps S10 to S14, the focal-plane shutter 280 is set in the normally open state.

In a case where the focal-plane shutter 280 is in the normally open state, the imaging and displaying of the live view image are performed according to a command of the main body CPU 220 (step S16). Accordingly, it is possible to perform framing at the time of imaging the still image.

Thereafter, it is determined whether or not the shutter release switch 22 is operated (step S18). In a case where it is determined that the shutter release switch 22 is operated (in the case of "Yes"), the main body CPU 220 controls the imaging element 201 through the imaging element controller 202, and starts the exposure at the time of imaging the still image by using the electronic shutter (step S20).

The FPS controller 296 magnetizes the front-curtain electromagnet 288A and the rear-curtain electromagnet 288B immediately before the exposure is completed after the exposure using the electronic shutter is started, attracts and holds the second front-curtain drive lever 286$A_2$ and the second rear-curtain drive lever 286$B_2$ in the charge positions (step S22), and cancels the locking of the second front-curtain drive lever 286$A_2$ and the second rear-curtain drive lever 286$B_2$ (charging member 288) using the lock mechanism 293 (step S24). The curtain running preparation is performed through the control in steps S22 and S24.

In the curtain running preparation is ended, the FPS controller 296 causes the front curtains to run by demagnetizing the front-curtain electromagnet 288A (step S26). Subsequently, the FPS controller causes the rear curtains to run by demagnetizing the rear-curtain electromagnet 288B, and completes the exposure (step S28). In the running of the front curtains in step S26, only the second front-curtain drive lever 286$A_2$ is rotated, and the front curtains do not run.

After the exposure at the time of imaging the still image is ended, the image signals are read out from the imaging element 201 (step S30).

In a case where the next still image is captured, the process returns to step S10, and the processes from steps S10 to S30 are repeated whenever the still image is captured.

Others

The digital camera to which the present invention is applied is not limited to the mirrorless digital single-lens camera. The digital camera may be a digital single-lens camera or an integrated-lens digital camera. Any camera may be used as long as a digital camera having the focal-plane shutter mounted thereon is used.

The focal-plane shutter is not limited to the focal-plane shutter capable of switching between the normal opening operation and the normal closing operation, and may be a focal-plane shutter that performs only the normal opening operation or may be a focal-plane shutter capable of performing the normal opening operation.

Although it has been described in the present embodiment that the rear-curtain drive member is constituted by the first rear-curtain drive lever 286$B_1$ and the second rear-curtain drive lever 286$B_2$, the rear-curtain drive member may be constituted by only one rear-curtain drive lever. In this case, it is necessary to provide the drive pin for connecting the rear-curtain running spring and the rear-curtain drive arm to one rear-curtain drive lever.

Although it has been described in the present embodiment that the front-curtain electromagnet 288A is magnetized in the curtain running preparation and is demagnetized at the time of the front curtain running, the front-curtain electromagnet 288A may not be magnetized in the curtain running preparation. In this case, it is not necessary to demagnetize the front-curtain electromagnet 288A, and the second rear-curtain drive lever 286$B_2$ is rotated in the clockwise direction in a case where the locking of the second rear-curtain drive lever 286$B_2$ in the charge position is canceled at the time of the curtain running preparation.

The present invention is not limited to the above-described embodiments, and may be modified without departing from the spirit of the present invention.

EXPLANATION OF REFERENCES

10: digital camera
20: finder window
22: shutter release switch
23: shutter speed dial
24: exposure correction dial
25: power lever
26: eyepiece portion
27: OK key
28: cross key
29: playback button
30: built-in flash
100: interchangeable lens
102: imaging optical system
104: zoom lens
106: focus lens
108: stop
114: zoom lens controller
116: focus lens controller
118: stop controller
120: lens CPU
122: RAM
124: ROM
126: flash ROM
136A: magnetic piece
136B: magnetic piece
150: lens communication unit
160: lens mount
200: camera main body
201: imaging element
202: imaging element controller
203: analog signal processing unit
204: A/D converter
205: image input controller
206: digital signal processing unit
207: RAM
208: compression/decompression processing unit
210: media controller
212: memory card
214: display controller
216: monitor
220: main body CPU
222: operation unit
224: timepiece unit
226: flash ROM
228: ROM
230: AF detection unit
232: brightness detection unit
234: white balance correction unit
236: wireless communication unit
238: GPS receiving unit
240: power supply controller
242: battery
244: lens power supply switch
250: main body communication unit
260: main body mount
260A: terminal
270: flash emitting unit
272: flash controller
280: focal-plane shutter
281: exposure opening portion
282: shutter ground plate
283A: front curtain
283B: rear curtain
284$A_1$: front-curtain drive arm
284$A_2$: front-curtain drive arm
284$B_1$: rear-curtain drive arm
284$B_2$: rear-curtain drive arm
284$a_1$: spindle
284$a_2$: spindle

284$b_1$: spindle
284$b_2$: spindle
285: base plate
285A: long hole
285B: long hole
286$A_1$: first front-curtain drive lever
286$A_2$: second front-curtain drive lever
286Aa: magnetic piece
286Ab: abutment pin
286Ac: stopper
286Ad: cam follower
286Ae: drive pin
286$B_1$: first rear-curtain drive lever
286$B_2$: second rear-curtain drive lever
286Ba: magnetic piece
286Bb: abutment pin
286Bc: stopper
286Bd: cam follower
286Be: drive pin
286$a$: spindle
286$b$: spindle
287A: front-curtain running spring
287B: rear-curtain running spring
288: charging member
288A: front-curtain electromagnet
288Aa: cam surface
288B: rear-curtain electromagnet
288Bb: cam surface
288$a$: spindle
289: front-curtain lock lever
289A: stopper
289B: stopper
289$a$: spindle
290A: motor drive unit
290B: charge motor
291: power transmission mechanism
292: lock mechanism drive unit
293: lock mechanism
294: front-curtain lock lever drive unit
295A: electromagnet drive unit
295B: electromagnet drive unit
296: FPS controller
297: determination unit
298: switch unit
S10 to S30: step

What is claimed is:

1. A digital camera comprising:

a focal-plane shutter;

an imaging element; and a controller that controls the focal-plane shutter and the imaging element, the controller is configured to control the focal-plane shutter to fully open an exposure opening portion by moving a second front-curtain drive member and a rear-curtain drive member to the charge positions, respectively, by using a charging member and holding the second front-curtain drive member and the rear-curtain drive member in charge positions, respectively, by a lock mechanism, in a state in which running of front curtains in a closing direction is inhibited by a front-curtain lock member, perform electronic shutter control for starting exposure by discharging electric charges accumulated in the imaging element in a case where the exposure opening portion is fully opened and a shutter release switch is operated, perform curtain running preparation for inhibiting rotational movement of the rear-curtain drive member in a first direction by magnetizing at least a rear-curtain electromagnetic actuator immediately before the exposure is completed and canceling the holding of the second front-curtain drive member and the rear-curtain drive member in the charge positions using the lock mechanism, after the exposure is started by the electronic shutter control and complete the exposure by demagnetizing the rear-curtain electromagnetic actuator after the curtain running preparation is ended and causing rear curtains to run in a closing direction through the rear-curtain drive member by using a biasing force of a rear-curtain running spring, wherein a point of time immediately before the exposure is completed when the curtain running preparation is started is a point of time close to a point of time when the rear curtain running is started, and a point of time earlier than the point of time when the running of the rear curtains is started by a time required for the curtain running preparation.

2. The digital camera according to claim 1, wherein the controller continuously reads out image signals from the imaging element, and enables a live view image to be displayed in a case where the exposure opening portion is fully opened.

3. The digital camera according to claim 1, wherein the controller is configured to read out image signals from the imaging element for a period during which the exposure opening portion is fully closed after the exposure is completed in a case of long exposure in which an exposure time is equal to or greater than a predetermined time, read out noise signals from the imaging element by performing the electronic shutter control for accumulating the electric charges for the same time as a time during which the imaging element is exposed for a period during which the exposure opening portion is fully closed after the image signals are read out, and obtain image signals from which noise is removed by subtracting the readout noise signals from the readout image signals.

4. The digital camera according to claim 1, wherein the controller discharges the electric charges accumulated in the imaging element according to a reset sequence that simulates running characteristics of the rear curtains in the closing direction in a case where the electronic shutter control is performed.

5. The digital camera according to claim 1, wherein the controller is further configured to determine whether or not an exposure time is equal to or greater than a time required for the curtain running preparation, wherein, in a case where controller determines that the exposure time is less than the time required for the curtain running preparation, the controller completes the curtain running preparation at least before the rear-curtain electromagnetic actuator is demagnetized by setting starting of an operation of the curtain running preparation to be performed earlier than starting of the electronic shutter control.

6. The digital camera according to claim 1, wherein, in a case where an exposure start command through an operation of the shutter release switch is input, the controller starts the exposure through the electronic shutter control by delaying a time by at least the time required for the curtain running preparation after the exposure start command is input, and in a case where an exposure completion command through an operation of the shutter release switch is input, the controller performs the curtain running preparation, and completes the exposure by demagnetizing the rear-curtain electromagnetic actuator after the delayed time elapses from when the exposure completion command is input and causing the rear curtains to run in the closing direction through the rear-curtain drive member by using the biasing force of the rear-curtain running spring.

7. The digital camera according to claim 1, further comprising:

a switch unit that switches between a first mode and a second mode, wherein, in a case where the switching to the first mode is performed by the switch unit, the controller fully opens the exposure opening portion by moving the second front-curtain drive member and the rear-curtain drive member to the charge positions, respectively, by the charging member and holding the second front-curtain drive member and the rear-curtain drive member in the charge positions by the lock mechanism in a state in which the running of the front curtains in the closing direction is inhibited by the front-curtain lock member, performs the electronic shutter control for starting the exposure by discharging the electric charges accumulated in the imaging element in a case where the exposure opening portion is fully opened and the shutter release switch is operated, performs the curtain running preparation for inhibiting the rotational movement of the rear-curtain drive member in the first direction by magnetizing at least the rear-curtain electromagnetic actuator immediately before the exposure is completed and canceling the holding of the second front-curtain drive member and the rear-curtain drive member in the charge positions using the lock mechanism, and completes the exposure by demagnetizing the rear-curtain electromagnetic actuator after the curtain running preparation is ended and causing the rear curtains to run in the closing direction through the rear-curtain drive member by using the biasing force of the rear-curtain running spring, and in a case where the switching to the second mode is performed by the switch unit, the controller fully opens the exposure opening portion by moving the second front-curtain drive member and the rear-curtain drive member to the charge positions, respectively, by the charging member and holding the second front-curtain drive member and the rear-curtain drive member in the charge positions, respectively, by the lock mechanism, in a state in which the running of the front curtains in the closing direction is inhibited by the front-curtain lock member, fully closes the exposure opening portion by canceling the inhibition of the running of the front curtains in the closing direction using the front-curtain lock member and causing the front curtains to run in the closing direction by using a biasing force of a return spring in a case where the exposure opening portion is fully opened and the shutter release switch is operated, performs the curtain running preparation for inhibiting the movement of the second front-curtain drive member and the rear-curtain drive member in the first direction by magnetizing a front-curtain electromagnetic actuator and the rear-curtain electromagnetic actuator, respectively, and canceling the holding of the second front-curtain drive member and the rear-curtain drive member in the charge positions using the lock mechanism, start the exposure by demagnetizing the front-curtain electromagnetic actuator after the curtain running preparation is ended and causing the front curtains to run in the opening direction through the second front-curtain drive member and the first front-curtain drive member by using a biasing force of a front-curtain running spring, and completes the exposure by demagnetizing the rear-curtain electromagnetic actuator and causing the rear curtains to run in the closing direction through the rear-curtain drive member by using the biasing force of the rear-curtain running spring after the exposure is started.

8. The digital camera according to claim 1, wherein, in a case where the curtain running preparation is not completed at the time of performing a completion operation of the exposure, the controller completes the exposure by canceling the inhibition of the running of the front curtains in the closing direction using the front-curtain lock member and causing the front curtains to run in the closing direction by using a biasing force of a return spring.

9. The digital camera according to claim 8, wherein, in a case where the curtain running preparation is not completed at the time of performing the completion operation of the exposure and the running of the front curtains in the closing direction by using the biasing force of the return spring is not possible, the controller completes the exposure by reading out image signals from the imaging element.

10. A control method of a digital camera that comprises a focal-plane shutter, an imaging element, and a controller which controls the focal-plane shutter and the imaging element, the control method comprising:

a step of moving a front-curtain lock member and inhibiting running of front curtains in a closing direction, by the controller;

a step of fully opening an exposure opening portion by moving a second front-curtain drive member and a rear-curtain drive member in charge positions, respectively, by a charging member in a state in which running of the front curtains in the closing direction is inhibited and holding the second front-curtain drive member and the rear-curtain drive member in the charge positions, respectively, by a lock mechanism;

a step of performing electronic shutter control for starting exposure by discharging electric charges accumulated in the imaging element in a case where the exposure opening portion is fully opened and a shutter release switch is operated;

a step of inhibiting the movement of the rear-curtain drive member in a first direction by magnetizing at least a rear-curtain electromagnetic actuator immediately before the exposure is completed, after the exposure is started by the electronic shutter control;

a step of performing curtain running preparation, by the controller, for canceling the holding of the second front-curtain drive member and the rear-curtain drive member in the charge positions using the lock mechanism after the movement of the rear-curtain drive member is inhibited by the rear-curtain electromagnetic actuator; and a step of completing the exposure by demagnetizing the rear-curtain electromagnetic actuator after the curtain running preparation is ended and causing rear curtains to run in a closing direction through the rear-curtain drive member by using a biasing force of a rear-curtain running spring, wherein a point of time immediately before the exposure is completed when the curtain running preparation is started is a point of time close to a point of time when the rear curtain running is started, and a point of time earlier than the point of time when the running of the rear curtains is started by a time required for the curtain running preparation.

11. The control method of a digital camera according to claim 10, wherein the controller continuously reads out image signals from the imaging element, and enables a live view image to be displayed in a case where the exposure opening portion is fully opened.

12. The control method of a digital camera according to claim 10, further comprising:

a step of reading out image signals from the imaging element for a period during which the exposure opening portion is fully closed after the exposure is completed in a case of long exposure in which an exposure time is equal to or greater than a predetermined time;

a step of reading out noise signals from the imaging element by performing the electronic shutter control for accumulating the electric charges for the same time as a time during which the imaging element is exposed for a period during which the exposure opening portion is fully closed after the image signals are read out; and a step of obtaining image signals from which noise is removed by subtracting the readout noise signals from the readout image signals.

13. The control method of a digital camera according to claim 10, wherein the controller discharges the electric charges accumulated in the imaging element according to a reset sequence that simulates running characteristics of the rear curtains in the closing direction in a case where the electronic shutter control is performed.

14. The control method of a digital camera according to claim 10, further comprising:

a step of determining whether or not an exposure time is equal to or greater than a time required for the curtain running preparation; and a step of completing the curtain running preparation at least before the rear-curtain electromagnetic actuator is demagnetized by setting starting of an operation of the curtain running preparation to be performed earlier than starting of the electronic shutter control in a case where it is determined that the exposure time is less than the time required for the curtain running preparation.

* * * * *